(12) United States Patent
Wang et al.

(10) Patent No.: US 11,984,591 B1
(45) Date of Patent: May 14, 2024

(54) SODIUM-CONTAINING OXIDE POSITIVE ELECTRODE MATERIAL AND PREPARATION METHOD THEREFOR AND USE THEREOF, AND POSITIVE ELECTRODE PLATE AND USE THEREOF

(71) Applicant: Beijing Easpring Material Technology Co., Ltd., Beijing (CN)

(72) Inventors: Jun Wang, Beijing (CN); Feijiang Chen, Beijing (CN); Yafei Liu, Beijing (CN); Yanbin Chen, Beijing (CN)

(73) Assignee: Beijing Easpring Material Technology Co., Ltd., Beijing (CN)

( * ) Notice: Subject to any disclaimer, the term of this patent is extended or adjusted under 35 U.S.C. 154(b) by 0 days.

(21) Appl. No.: 18/400,125

(22) Filed: Dec. 29, 2023

Related U.S. Application Data

(63) Continuation of application No. PCT/CN2023/082410, filed on Mar. 20, 2023.

(30) Foreign Application Priority Data

Mar. 30, 2022 (CN) ......................... 202210334270.0

(51) Int. Cl.
*H01M 4/505* (2010.01)
*C01G 49/00* (2006.01)
*C01G 51/00* (2006.01)
*C01G 53/00* (2006.01)
*C01G 55/00* (2006.01)
*H01M 4/525* (2010.01)
(Continued)

(52) U.S. Cl.
CPC ........ *H01M 4/505* (2013.01); *C01G 49/0072* (2013.01); *C01G 51/66* (2013.01); *C01G 51/70* (2013.01); *C01G 53/50* (2013.01); *C01G 53/66* (2013.01); *C01G 53/70* (2013.01); *C01G 55/002* (2013.01); *H01M 4/525* (2013.01); *H01M 10/054* (2013.01); *C01P 2002/52* (2013.01); *C01P 2002/72* (2013.01); *C01P 2002/74* (2013.01); *C01P 2004/03* (2013.01); *C01P 2006/10* (2013.01); *C01P 2006/11* (2013.01); *C01P 2006/12* (2013.01); *C01P 2006/40* (2013.01); *H01M 2004/021* (2013.01); *H01M 2004/028* (2013.01)

(58) Field of Classification Search
CPC ............................ H01M 4/505; C01G 9/0072
See application file for complete search history.

(56) References Cited

U.S. PATENT DOCUMENTS

2022/0037660 A1  2/2022  Zhu et al.

FOREIGN PATENT DOCUMENTS

| CN | 106207138 A | 12/2016 |
| CN | 109786721 A | 5/2019 |
| CN | 111403729 A | 7/2020 |

(Continued)

OTHER PUBLICATIONS

Machine translation of the PCT-237 Written Opinion for WO 2023169591 (no date) (Year: 0000).*

(Continued)

Primary Examiner — Amanda C. Walke
(74) Attorney, Agent, or Firm — Sughrue Mion, PLLC

(57) ABSTRACT

A sodium-containing oxide positive electrode material and a preparation method therefor and use thereof are disclosed. Also disclosed are a positive electrode plate and uses thereof.

20 Claims, 8 Drawing Sheets

(51) Int. Cl.
*H01M 10/054* (2010.01)
*H01M 4/02* (2006.01)

(56) References Cited

FOREIGN PATENT DOCUMENTS

| | | | | | |
|---|---|---|---|---|---|
| CN | 111554919 | A | | 8/2020 | |
| CN | 111710838 | A | | 9/2020 | |
| CN | 112689614 | A | * | 4/2021 | ............. C01G 53/44 |
| CN | 114843498 | A | | 8/2022 | |
| CN | 114975982 | A | * | 8/2022 | ............. C01G 53/50 |
| CN | 115196683 | A | * | 10/2022 | ......... C01G 45/1228 |
| CN | 115472820 | A | * | 12/2022 | |
| CN | 115504526 | A | * | 12/2022 | |
| CN | 116102086 | A | * | 5/2023 | |
| KR | 10-2018-0026019 | A | | 3/2018 | |
| WO | 2017/104736 | A1 | | 6/2017 | |
| WO | WO-2021208299 | A1 | * | 10/2021 | ............. H01M 10/36 |

OTHER PUBLICATIONS

Qi Xingguo, et al., "Surface modification research of layered oxide materials for sodium-ion batteries", Energy Storage Science and Technology, Sep. 2020, vol. 9, No. 5 (7 pages).

* cited by examiner

SODIUM-CONTAINING OXIDE POSITIVE ELECTRODE MATERIAL AND PREPARATION METHOD THEREFOR AND USE THEREOF, AND POSITIVE ELECTRODE PLATE AND USE THEREOF

CROSS-REFERENCE TO RELATED APPLICATIONS

This application is a continuation application of International Application No. PCT/CN2023/082410 filed on Mar. 20, 2023, which claims the benefit of priority from Chinese Application No. "202210334270.0", filed on Mar. 30, 2022, entitled "SODIUM-CONTAINING OXIDE CATHODE MATERIAL, PREPARATION METHOD AND USE THEREOF, POSITIVE ELECTRODE AND USE THEREOF", the content of which is entirely incorporated herein by reference.

FIELD

The present disclosure relates to the technical field of sodium ion batteries, particularly to a sodium-containing oxide cathode material, a preparation method and use thereof, and a positive electrode and use thereof.

BACKGROUND

Lithium-ion batteries have been successfully applied to portable electronic products. The application scenarios of lithium-ion batteries are gradually expanding to the fields such as large-scale energy storage power grids, and electric vehicles at present. However, the dramatic increase in demand for lithium-ion batteries under the circumstance of limited lithium resources may bring forth the problem of excessively high costs in the future, thus the development of alternative energy storage systems is quite necessary. In recent years, sodium-ion batteries have attracted renewed attention from people due to their natural abundance and low cost of sodium resources.

For the past few years, a large number of studies have been conducted by researchers on the development of novel electrode materials for sodium-ion batteries, and a lamellar transition metal oxide $Na_xMeO_2$ (Me is generally a transition metal) has been studied by utilizing its advantages of easy synthesis process and desirable electrochemical activity. Among them, the cheap and environment-friendly $\alpha$-$NaTeO_2$ and $Na_xMnO_2$ have attracted widespread attention, and $\alpha$-$Na_xFeO_2$ has a reversible capacity of about 80 mAh·g$^{-1}$ under a voltage platform of 3.3 V or so. However, when the charging of $\alpha$-$NaTeO_2$ reaches a level of x>0.5, the insertion of Na$^+$ into the main structure is disturbed by the irreversible structural changes. Although the material $Na_xMnO_2$ with a lamellar structure has an initial capacity of more than 150 mAh·g$^{-1}$, its capacity attenuates rapidly, thereby limiting its use. In addition, given that the Na element is very active, the surface of $Na_xMnO_2$ material usually has a high content of soluble alkali in the preparation process, so that Na$^+$ ions are prevented from deintercalation and decomposition to generate gas during the charging and discharging process, thus the capacity of the material is reduced, both the cycle stability and safety of the material are degraded.

Therefore, it has important significance to develop the $Na_xMnO_2$ cathode material with a lamellar structure of the sodium ion battery having high capacity, long cycle life, and high rate performance.

SUMMARY

The present disclosure aims to overcome the defects in the prior art that the excessively high content of the soluble alkali on the surface of a sodium-containing metal oxide material causes the safety performance of the material is reduced, the specific discharge capacity and the rate performance are degraded, and the cycle stability is deteriorated due to serious side reaction in the cycle process. The present disclosure provides a sodium-containing metal oxide cathode material, a preparation method and a use thereof, and a positive electrode and use thereof, wherein the surface of the sodium-containing metal oxide cathode material has low soluble alkali content, and when the cathode material is applied to a sodium ion battery, the battery can have a high capacity, high rate performance and high safety, and sodium ion deintercalation/intercalation reaction can be continuously performed without obviously causing reduction of the battery capacity.

In order to fulfill the purposes, the first aspect of the present disclosure provides a sodium-containing oxide cathode material, wherein the content of soluble alkali on the surface of the cathode material satisfys the following conditions:

$$m(Na_2CO_3)+m(NaOH) \text{ is less than or equal to } 15000 \text{ ppm;} \quad (1)$$

$$0.1 \leq m(Na_2CO_3)/m(NaOH) \leq 1 \quad (2)$$

The second aspect of the present disclosure provides a method for preparing the sodium-containing oxide cathode material comprising the following steps:

subjecting a sodium-manganese-iron-containing cathode material precursor to first sintering, cooling, crushing, and sieving to obtain a sodium-containing oxide cathode material;

wherein an oxygen-containing atmosphere is introduced during the first sintering process;

the flow rate of the introduced oxygen-containing atmosphere is within the range of 1-15 m³/h, and the humidity of the oxygen-containing atmosphere is less than or equal to 10 RH %;

the temperature T1 of the first sintering satisfys the following conditions: $500 \times (1+y) \leq T1 \leq 400 \times (3-y)°$ C., y denotes the content of Mn in the sodium-manganese-iron-containing oxide cathode material;

the constant temperature time of the first sintering is within the range of 6-20 h;

the temperature rise rate of the first sintering is less than or equal to 10° C./min.

The third aspect of the present disclosure provides a sodium-containing oxide cathode material produced with the aforementioned preparation method.

The fourth aspect of the present disclosure provides a positive electrode comprising at least 80 wt % of a sodium-containing oxide cathode material, based on the total weight of the positive electrode;

wherein the sodium-containing oxide cathode material is the aforementioned sodium-containing oxide cathode material.

The fifth aspect of the present disclosure provides a use of the aforementioned sodium-containing oxide cathode material or the aforesaid positive electrode in the sodium ion batteries.

Due to the technical scheme, the sodium-containing oxide cathode material, a preparation method and a use thereof, a positive electrode and a use thereof provided by the present disclosure produce the favorable effects as follows:

the surface of the sodium-containing metal oxide cathode material provided by the present disclosure has a low content of the soluble alkali, and when the cathode material is applied to a sodium ion battery, the battery can have a high capacity, high rate performance and high safety, and sodium ion deintercalation/intercalation reaction can be continuously performed without obviously causing reduction of the battery capacity.

Furthermore, the sodium-containing oxide cathode material provided by the present disclosure contains a specific doping element, which can expedite the reaction of sodium with metal oxide or metal hydroxide, reduce the content of soluble alkali on the surface of the material, stabilize the surface structure of the material particles or the interface strength among the particles or the grain boundary structure among primary particles, and prolong the cycle life of the battery containing the cathode material, in addition, it can accelerate the transmission capacity of the sodium ions between the particles and between the interfaces, thereby improving the rate performance of the battery containing the cathode material.

The preparation method of the sodium-containing oxide cathode material provided by the present disclosure comprises introducing a specific oxygen-containing atmosphere and roasting under specific conditions, the content of soluble alkali on the surface of the prepared sodium-containing oxide cathode material can be reduced, thereby significantly improving the charge-discharge capacity, cycle rate, cycle life, safety performance and the like of the sodium ion batteries containing the cathode material.

DETAILED DESCRIPTION

Figure 1:
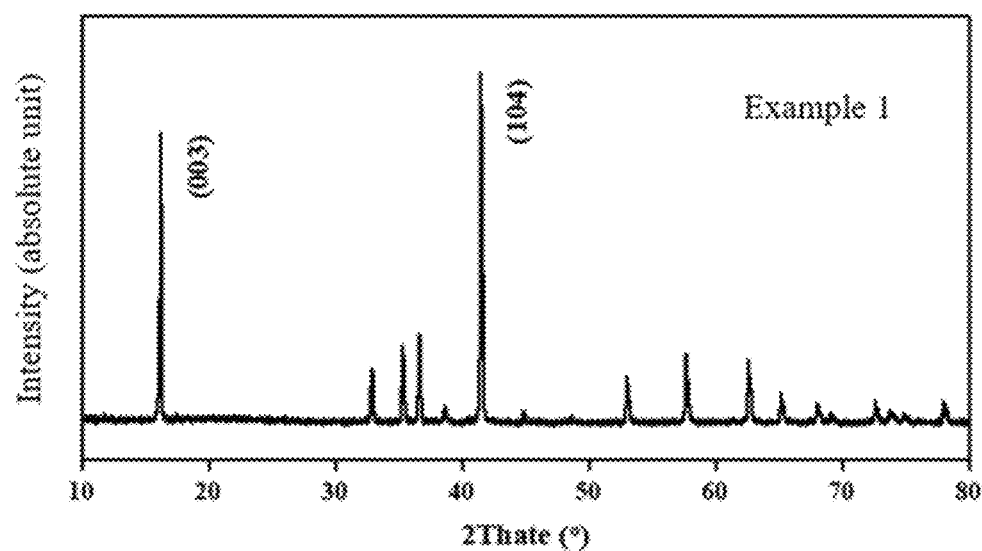
FIG. 1 is an X-Ray Diffraction (XRD) pattern of the sodium-containing oxide cathode material prepared in Example 1.
Figure 2:
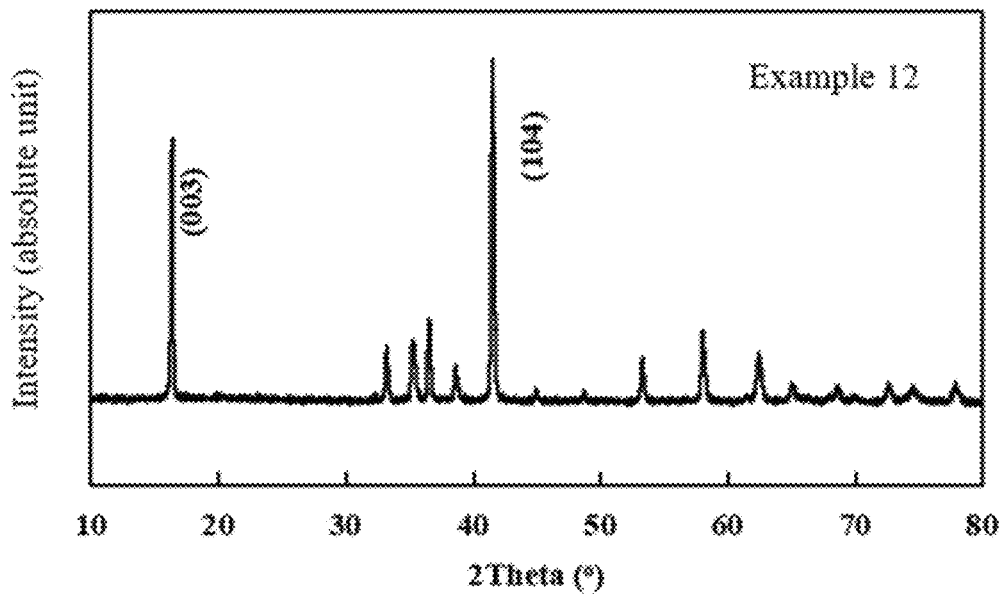
FIG. 2 is an XRD pattern of the sodium-containing oxide cathode material prepared in Example 12.
Figure 3:
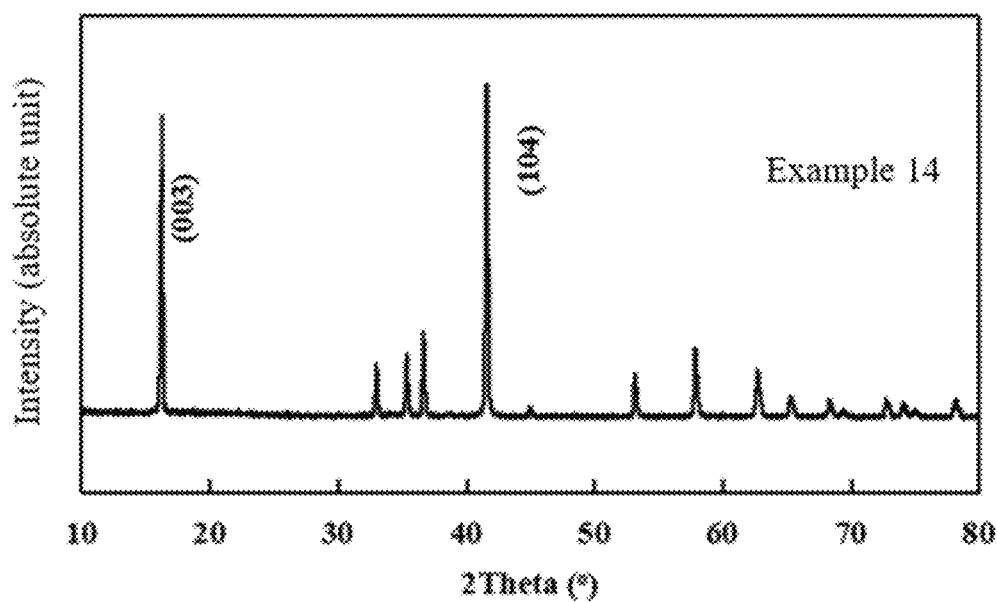
FIG. 3 is an XRD pattern of the sodium-containing oxide cathode material prepared in Example 14.
Figure 4:
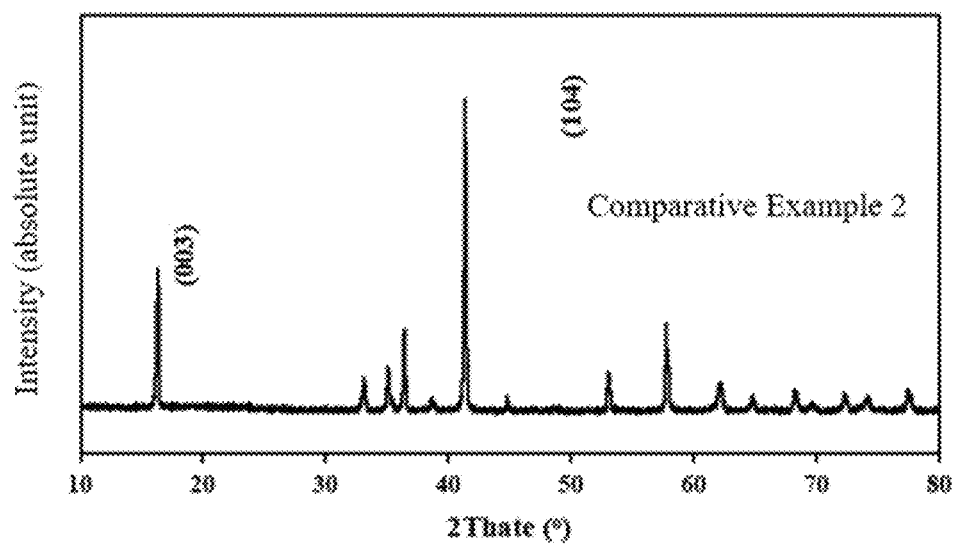
FIG. 4 is an XRD pattern of the sodium-containing oxide cathode material prepared in Comparative Example 2.

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

In the first aspect, the present disclosure provides a sodium-containing oxide cathode material, wherein the content of soluble alkali on the surface of the cathode material satisfys the following conditions:

$$m(Na_2CO_3)+m(NaOH) \text{ is less than or equal to } 15000 \text{ ppm}; \quad (1)$$

$$0.1 \leq m(Na_2CO_3)/m(NaOH) \leq 1 \quad (2)$$

In the present disclosure, the surface of the sodium-containing metal oxide cathode material has a low soluble alkali content, and when the cathode material is applied to a sodium ion battery, the battery can have a high capacity, high rate performance and high safety, and sodium ion deintercalation/intercalation reaction can be continuously performed without obviously causing reduction of the battery capacity.

In the present disclosure, the surface of the sodium-containing oxide cathode material has a low content of soluble alkali, it can avoid the phenomenon that the charge-discharge capacity of the sodium batteries containing the cathode material is reduced due to the increased content of the non-electrochemical active substance in the cathode material caused by the over-high content of the soluble alkali content on the surface of the cathode material; in addition, it can refrain from the degrading of the rate performance caused by the increase of the surface inert layer thickness of the cathode material and the resistance of the cathode material due to the over-high content of soluble alkali on the surface.

Furthermore, the surface of the sodium-containing oxide cathode material provided by the present disclosure has low soluble alkali content, it can avoid the circumstances such as the side reaction between the soluble alkali on the material surface and an electrolyte solution during the continuous charge-discharge cycle process of the battery, the accelerated consumption of the electrolyte, an occurrence of gas generation, the cycle stability and the safety of the battery are declined, or even failure of the batteries.

Further, the content of surface soluble alkali on the surface of the cathode material satisfys the following conditions:

$$m(Na_2CO_3) \text{ in } (NaOH) \text{ is less than or equal to } 12000 \text{ ppm}; \quad (1)$$

$$0.1 \leq m(Na_2CO_3)/m(NaOH) \leq 0.6. \quad (2)$$

In the present disclosure, the content of soluble alkali on the surface of the cathode material is measured with the Metrohm 888/905 instrument.

According to the present disclosure, the cathode material is heat treated under the temperature condition of 500-900° C., and the content of soluble alkali on the surface of the cathode material after treatment satisfys the following conditions:

$\Delta\lambda[m(Na_2CO_3)+m(NaOH)]$ is less than or equal to 10%;

$\Delta\lambda[m(Na_2CO_3)/m(NaOH)]$ is less than or equal to 50%;

wherein, $$\Delta\lambda[m(Na_2CO_3 + NaOH] = \frac{[m(Na_2CO_3) + m(NaOH)]_0 - [m(Na_2CO_3) + m(NaOH)]_1}{[m(Na_2CO_3) + m(NaOH)]_0} \times 100\%;$$

$$\Delta\lambda[m(Na_2CO_3)/m(NaOH)] = \frac{m(Na_2CO_3)_1/m(NaOH)_1 - m(Na_2CO_3)_0/m(NaOH)_0}{m(Na_2CO_3)_0/m(NaOH)_0} \times 100\%;$$

$[m(Na_2CO_3)+m(NaOH)]_0$ denotes the total content of soluble alkali on the surface of the cathode material before treatment; $[m(Na_2CO_3)+m(NaOH)]_1$ denotes the total content of soluble alkali on the surface of the cathode material after treatment; $m(NaOH)_0$ denotes the content of NaOH on the surface of the cathode material before treatment; $m(NaOH)_1$ denotes the content of NaOH on the surface of the cathode material after treatment; $m(Na_2CO_3)_0$ denotes the content of $Na_2CO_3$ on the surface of the cathode material before treatment; $m(Na_2CO_3)_1$ denotes the content of $Na_2CO_3$ on the surface of the cathode material after treatment.

In the present disclosure, the cathode material is subjected to heat treatment under the high-temperature condition, and both the absolute content change value of soluble alkali on the surface of the cathode material and the absolute change value of the content ratio of $Na_2CO_3$ to NaOH on the surface before and after the heat treatment are small, it indicates that the surface structure of the material is stable, and the soluble alkali can hardly diffuse into the material body or participate in reaction even at a high temperature, such that the sodium ion batteries prepared with the cathode material have high charge and discharge capacity, high cycle rate, long cycle life, and excellent safety performance.

Further, $\Delta\lambda[m(Na_2CO_3)+m(NaOH)]$ is less than or equal to 5%.

Further, $\Delta\lambda[m(Na_2CO_3)/m(NaOH)]$ is less than or equal to 30%.

According to the present disclosure, $FWHM_{(003)}$ of the (003) crystal plane, and $FWHM_{(104)}$ of the (104) crystal plane of the cathode material obtained through the X-Ray Diffraction (XRD) satisfy the following conditions:

$0.1 \leq FWHM_{(003)} \leq 0.3$;

$0.1 \leq FWHM_{(104)} \leq 0.4$.

In the present disclosure, the $FWHM_{(003)}$ of the (003) crystal plane and the $FWHM_{(104)}$ of the (104) crystal plane of the cathode material obtained through the X-Ray Diffraction (XRD) satisfy the aforementioned conditions, it indicates that the cathode material has suitable crystallinity and low content of soluble alkali on the surface, thus the lithium batteries prepared with the cathode material have high charge and discharge capacity, high cycle rate, long cycle life, and excellent safety performance.

Further, $FWHM_{(003)}$ of the (003) crystal plane and $FWHM_{(104)}$ of the (104) crystal plane of the cathode material obtained through the XRD meet the following conditions:

$0.13 \leq FWHM_{(003)} \leq 0.24$;

$0.15 \leq FWHM_{(104)} \leq 0.30$.

According to the present disclosure, $FWHM_{(003)}$ of the (003) crystal plane and $FWHM_{(104)}$ of the (104) crystal plane of the cathode material obtained through the XRD satisfy the following conditions:

$0.5 \leq FWHM_{(003)}/FWHM_{(104)} \leq 1.2$.

In the present disclosure, the cathode material with the aforementioned structural characteristics has suitable crystallinity, desirable structural stability, and low soluble alkali content on the surface, so the sodium ion batteries prepared with the cathode material have high charge and discharge capacity, high cycle rate, long cycle life, and excellent safety performance.

Further, $0.7 \leq FWHM_{(003)}/FWHM_{(104)} \leq 1$.

According to the present disclosure, peak area S(003) of the (003) crystal plane and peak area S(104) of the (104) crystal plane of the cathode material obtained through the XRD satisfy the following conditions:

$0.5 \leq S_{(003)}/S_{(104)} \leq 1.5$.

In the present disclosure, the peak area $S_{(003)}$ of the (003) crystal plane and the peak area $S_{(104)}$ of the (104) crystal plane of the cathode material obtained through the XRD satisfy the aforementioned conditions, indicating that the cathode material has desirable structural stability and suitable distribution of crystal planes, thereby allowing the sodium ion batteries made from the cathode material to have high charge and discharge capacity, high cycle rate, long cycle life and excellent safety performance.

Further, $0.7 \leq S_{(003)}/S_{(104)} \leq 1.2$.

According to the present disclosure, the tap density of the cathode material is more than or equal to 1.2 g/cm³; the compacted density of the cathode material is more than or equal to 2.5 g/cm³.

In the present disclosure, the cathode material has a high tap density and a high compacted density, thereby enabling the sodium ion batteries made from the cathode material to have a high electrode density, a high energy density, a long cycle life, and excellent safety performance.

Further, the tap density of the cathode material is more than or equal to 1.5 g/cm³, preferably more than or equal to 1.8 g/cm³; the compacted density of the cathode material is more than or equal to 2.8 g/cm³, preferably more than or equal to 3.2 g/cm³.

According to the present disclosure, the specific surface area BET of the cathode material satisfys the following conditions:

0.5 m²/g≤BET≤4 m²/g, preferably, 1.5 m²/g≤BET≤3 m²/g.

According to the present disclosure, the cathode material has a composition represented by the general formula I:

$$Na_{1-x}[Mn_yFe_zM_u]M'_jO_{2-w}F_w \qquad \text{formula I}$$

wherein $0 \leq x \leq 0.4$, $0.2 \leq y \leq 0.6$, $0.1 \leq z \leq 0.4$, $0 \leq u \leq 0.5$, $0 \leq j \leq 0.1$, $0 \leq w \leq 0.1$, M is at least one element selected from the group consisting of Li, Mg, Al, Cu, Zn, Zr, Nb, Co, Ti, Y, Sc, Cr, W, La, Mo, Os, Pr, Re, Ru, Sr, Sin, and Ta; and M' is at least one element selected from the group consisting of Mg, Al, Cu, Zn, Zr, Nb, Co, Ti, Y, Sc, Cr, W, La, Mo, Os, Pr, Re, Ru, Sr, Sin, and Ta.

In the present disclosure, the sodium-containing oxide cathode material provided by the present disclosure contains a specific doping element, which can expedite the reaction of sodium with metal oxide or metal hydroxide, reduce the content of soluble alkali on the surface of the material, stabilize the surface structure of the material particles or the interface strength among the particles or the grain boundary structure among primary particles, and prolong the cycle life of the battery containing the cathode material, in addition, it can accelerate the transmission capacity of the sodium ions between the particles and between the interfaces, thereby improving the rate performance of the battery containing the cathode material.

Furthermore, $0.05 \leq x \leq 0.3$, $0.3 \leq y \leq 0.5$, $0.15 \leq z \leq 0.35$, $0 \leq u \leq 0.3$, $0 \leq j \leq 0.05$, $0 \leq w \leq 0.05$, M is at least one element selected from the group consisting of Li, Mg, Al, Cu, Zn, Zr, Nb, Co, Ti, Y, Sc, Cr, W, La, Mo, and Sr; and M' is at least one element selected from the group consisting of Mg, Al, Cu, Zn, Zr, Nb, Co, Ti, Y, Sc, Cr, W, La, Mo, and Sr.

In a specific embodiment of the present disclosure, M is at least one element selected from the group consisting of Co, Ti, Sc, Zr, W, Mg, Y, Cr, and Ta. The specific kind of elements can expedite the reaction of sodium with a metal oxide or a metal hydroxide, reduce the content of soluble alkali on the surface of the cathode material, stabilize the crystal structure of the material, and improve the rate performance and cycle life of the batteries prepared with the cathode material.

In a specific embodiment of the present disclosure, M is at least one element selected from the group consisting of V, T1, Zr, Mo, Nb, La, and W. The specific kind of elements can form a substance containing $Na_3VO_4$ or $Na_2Ti_3O_7$ or $Na_2ZrO_3$ or $Na_2MoO_4$ or $NaNbO_3$ or $LaMnO_{3.6}$, or $Na_2WO_4$ and the like on the surface of the cathode material particles or the interfaces between the particles, stabilize the surface structure of the material particles or the interface strength among the particles or the grain boundary structure among primary particles, reduce the content of soluble alkali on the surface of the cathode material, and prolong the cycle life of the battery containing the cathode material, in addition, it can accelerate the transmission capacity of the sodium ions between the particles and between the interfaces, thereby improving the rate performance of the battery assembled with the cathode material.

By adopting an appropriate additive (additive M) in the present disclosure, the reaction of sodium with a metal oxide or a metal hydroxide, or a metal carbonate can be expedited, so that the sodium chemical reaction is more sufficient, the content of soluble alkali on the surface of the material is reduced, the direct current internal resistance (DCIR) value and the gas production rate of the material during the charge-discharge cycle process are decreased, both the capacity and the cycle life of the material are improved.

In a second aspect, the present disclosure provides a method for preparing the sodium-containing oxide cathode material comprising the following steps:

subjecting a sodium-manganese-iron-containing cathode material precursor to first sintering, cooling, crushing, and sieving to obtain a sodium-containing oxide cathode material;

wherein an oxygen-containing atmosphere is introduced during the first sintering process;

the flow rate of the introduced oxygen-containing atmosphere is within the range of 1-15 m³/h, and the humidity of the oxygen-containing atmosphere is less than or equal to 10 RH %;

the temperature T1 of the first sintering meets the following conditions: $500 \times (1+y) \leq T1 \leq 400 \times (3-y)°$ C., y denotes the content of Mn in the sodium-manganese-iron-containing oxide cathode material;

the constant temperature time of the first sintering is within the range of 6-20 h;

the temperature rise rate of the first sintering is less than or equal to 10° C./min.

The present disclosure specifies the sintering temperature in the process of preparing the sodium-containing oxide cathode material, and the sintering temperature is correlated with the content of Mn in the sodium-manganese-iron-containing oxide cathode material. If the sintering temperature is too high, the sodium-containing oxide primary particles become large and agglomerate seriously, which is adverse to the capacity exertion of the cathode material; on the contrary, if the sintering temperature is too low, the precursor may not be completely reacted during the sintering process, it is difficult to form a suitable crystal structure, thereby exhibiting the low capacity and poor cycle stability.

In the present disclosure, the preparation method of the sodium-containing oxide cathode material comprises introducing a specific oxygen-containing atmosphere and sintering under specific conditions, so that the content of soluble alkali on the surface of the prepared sodium-containing oxide cathode material can be significantly reduced, thereby obviously improving the charge-discharge capacity, the cycle rate, the cycle life, the safety performance of the sodium ion batteries containing the cathode material.

Furthermore, the preparation method provided by the present disclosure can balance the costs for preparing the cathode material and the performance indicators of the prepared cathode material.

In the present disclosure, when the oxygen-containing atmosphere comprises air and oxygen gas, the ratio of the introduced amount of the air to the introduced amount of the oxygen gas is (1-5): 1, preferably (1-3): 1.

Furthermore, the flow rate of the introduced oxygen-containing atmosphere is within a range of 2-8 m³/h, and the humidity of the oxygen-containing atmosphere is less than or equal to 6 RH %.

Further, the oxygen-containing atmosphere comprises air and/or oxygen gas.

Further, the temperature T1 of the first sintering meets the following conditions: $550 \times (1+y) \leq T1 \leq 380 \times (3-y)°$ C.

Further, the constant temperature time of the first sintering is within the range of 8-15 h.

Further, the temperature rise rate of the first sintering is less than or equal to 8° C./min.

According to the present disclosure, the sodium-manganese-iron-containing oxide cathode material precursor is selected from a mixture of $[Mn_yFe_zM_u](OH)_2$, a Na source, and an additive M;

or a mixture of $[Mn_yFe_zM_u]CO_3$, a Na source, and an additive M;

or a mixture of Mn oxide and/or Mn hydroxide, Fe oxide and/or Fe hydroxide in a molar ratio of n(Mn):n(Fe)=y:z with a Na source and an additive M;

wherein the dosage of the Na source in the sodium-manganese-iron-containing oxide cathode material precursor meets the following conditions: $0.6 \leq n(Na)/n(Mn+Fe+M) \leq 1$;

the dosage of the additive M in the sodium-manganese-iron-containing oxide cathode material precursor meets the following conditions: $0 < n(M)/n(Mn+Fe+M) \leq 0.5$;

$0.2 \leq y \leq 0.6$, $0.1 \leq z \leq 0.4$, $0 \leq u \leq 0.5$, M is at least one element selected from the group consisting of Mg, Al, Cu, Zn, Zr, Nb, Co, Ti, Y, Sc, Cr, W, La, Mo, Os, Pr, Re, Ru, Sr, Sin, and Ta.

In the present disclosure, the uniformity of the mixed material is ensured by controlling the morphology, microstructure, particle size, and the like of the components (e.g., a sodium source, a metal oxide, a metal hydroxide, or a metal carbonate) contained in the sodium-manganese-iron-containing cathode material precursor mixture, thereby avoiding local enrichment of sodium content caused by unevenness of the mixed material. Specifically, $D_{50}$ of the sodium source in the present disclosure is controlled to be less than or equal to 1 μm, the $D_{50}$ of a metal oxide (e.g., an oxide of Fe, or an oxide of Mn) is controlled to be less than or equal to 2 μm, and $D_{50}$ of a metal hydroxide (e.g., a hydroxide of Mn, or a hydroxide of Fe) or a metal carbonate ($[Mn_yFe_zM_u]CO_3$) is controlled to be less than or equal to 15 μm, so that the uniformity of the mixed material is ensured, and the local enrichment of sodium content caused by unevenness of the mixed material is avoided, and the comprehensive performance of the prepared sodium-containing oxide cathode material is disadvantageously reduced can be averted.

Preparation of the Precursor with a Solid Phase Method

In a specific embodiment of the present disclosure, a method for preparing the sodium-manganese-iron-containing cathode material precursor comprising the following step:

uniformly mixing Mn oxide and/or Mn hydroxide, Fe oxide and/or Fe hydroxide in a molar ratio of n(Mn):n(Fe)=y:z with a Na source and an additive M to obtain the sodium-manganese-iron-containing oxide cathode material precursor.

According to the present disclosure, a Mn oxide and/or a Mn hydroxide, a Fe oxide and/or a Fe hydroxide, a Na source, and an additive M are mixed in a solid state with the aforementioned method, the method has the advantages of simple operation, easy modification of the components and ratio thereof, and the prepared cathode material has a large compacted density, such that the prepared sodium-manganese-iron-containing cathode material precursor produces the favorable effects such as low price, easy preparation, easy modification of composition, and large compacted density.

In the present disclosure, in order to improve the mixing uniformity of the components, it is preferable to add an appropriate amount of solvent (e.g., ethanol) during the mixing process.

In the present disclosure, the sodium source is at least one selected from the group consisting of sodium hydroxide, sodium carbonate, sodium sulfate, sodium oxalate, sodium chloride, sodium citrate, and sodium fluoride.

In the present disclosure, the additive M is at least one selected from the group consisting of oxides, hydroxides, oxyhydroxides, phosphates, fluorides, borides, carbonates, and oxalates containing element M.

In the present disclosure, the additive M is used in an amount such that in the sodium-manganese-iron-containing cathode material precursor, $0 < n(M)/n(Mn+Fe+M) \leq 0.5$, preferably $0.1 \leq n(M)/n(Mn+Fe+M) \leq 0.4$.

In the present disclosure, the sodium source is used in an amount such that in the sodium-manganese-iron-containing cathode material precursor, $0.6 \leq n(Na)/n(Mn+Fe+M) \leq 1$, preferably $0.7 \leq n(Na)/n(Mn+Fe+M) \leq 0.95$.

Preparation of the Precursor with a Liquid Phase Method

In another embodiment of the present disclosure, a method for preparing the sodium-manganese-iron-containing cathode material precursor comprising the following steps:

(1) preparing a mixed salt solution with an Mn salt and a Fe salt according to a molar ratio of n(Mn):n(Fe)=y:z; preparing a precipitating agent solution, a complexing agent solution, and an additive M solution with a precipitating agent, a complexing agent, and optionally an additive M respectively; introducing the mixed salt solution, the precipitating agent solution and the complexing agent solution into a reaction kettle in a concurrent flow, and carrying out a coprecipitation reaction to obtain a solid-liquid mixture, then filtering the solid-liquid mixture to obtain a filter cake, drying and sieving the filter cake to obtain an intermediate product;

(2) blending the intermediate product, a sodium source, and an optional additive M to obtain the sodium-manganese-iron-containing cathode material precursor.

According to the method, the Mn salt solution, the Fe salt solution, the optional additive M solution, the precipitating agent solution, and the complexing agent solution are subjected to coprecipitation reaction with the aforementioned method in a solution state to obtain an intermediate product; in addition, the intermediate product, the sodium source, and the optional additive M are uniformly mixed, so that the element distribution is more uniform, the precursor has a high activity and controllable morphology, so that the prepared sodium-manganese-iron-containing cathode material precursor produces the favorable effects that the high-temperature reaction can be readily implemented and the morphology can be easily controlled.

In the present disclosure, the sodium source is at least one selected from the group consisting of sodium hydroxide, sodium carbonate, sodium sulfate, sodium oxalate, sodium chloride, sodium citrate, and sodium fluoride.

In the present disclosure, the additive M is at least one selected from the group consisting of oxides, hydroxides, oxyhydroxides, phosphates, fluorides, borides, carbonates, and oxalates containing element M.

The present disclosure, the amounts of the additive M used in step (1) and step (2) are not particularly limited, as long as the additive M is used in an amount such that in the sodium-manganese-iron-containing cathode material precursor, $0 < n(M)/n(Mn+Fe+M) \leq 0.5$, preferably $0.1 \leq n(M)/n(Mn+Fe+M) \leq 0.4$.

In the present disclosure, the sodium source is used in an amount such that in the sodium-manganese-iron-containing cathode material precursor, $0.6 \leq n(Na)/n(Mn+Fe+M) \leq 1$, preferably $0.7 \leq n(Na)/n(Mn+Fe+M) \leq 0.95$.

In the present disclosure, the kinds of the precipitating agent and the complexing agent are not particularly limited, which may be conventional kinds of the precipitating agent and the complexing agent in the art, for example, the precipitating agent is sodium hydroxide and/or sodium carbonate, and the complexing agent is ammonium hydroxide.

In the present disclosure, the concentrations of the mixed salt solution, the precipitating agent solution, and the complexing agent solution are not particularly limited, which may be the conventional concentrations in the art.

In the present disclosure, the coprecipitation reaction conditions comprising: the reaction temperature is within the range of 25-60° C., the pH value is within the range of 8-11, the stirring speed is within the range of 200-1,000 rpm, and the reaction time is within the range of 10-30 h.

Washing

According to the present disclosure, the method further comprising: mixing and washing the sodium-containing oxide cathode material with a washing liquid, then filtering the mixture to obtain a filter cake, and drying the filter cake.

In the present disclosure, the sodium-containing oxide cathode material is further washed by using the washing liquid, so that the content of soluble alkali on the surface of the prepared sodium-containing oxide cathode material can be further reduced, thus the charge-discharge capacity, the cycle rate, the cycle life and the safety performance of the sodium ion batteries prepared with the cathode material are further improved.

According to the present disclosure, the washing liquid is selected from water and/or an acidic solution.

According to the present disclosure, the weight ratio of the sodium-containing oxide cathode material to the washing liquid is (0.5-3): 1, preferably (1-2.5): 1.

According to the present disclosure, the concentration of the acidic solution is 0.1-5 mol/L.

In the present disclosure, the acidic solution may be a conventional kind of acidic solution in the art, for example, an acetic acid solution.

According to the present disclosure, the washing conditions comprising: washing for 3-60 min under the stirring rate of 100-1,000 rpm and a temperature of 0-25° C.

Further, the washing conditions comprising: washing for 5-30 min under the stirring rate of 300-800 rpm and the temperature of 5-15° C.

Coating

According to the present disclosure, the method further comprising: subjecting the sodium-containing oxide cathode material and a coating agent M' to the ball milling and mixing, carrying out second sintering, cooling, crushing, and sieving the sintered product to obtain the sodium-containing oxide cathode material;

wherein an oxygen-containing atmosphere is introduced during the second sintering process;

the flow rate of the introduced oxygen-containing atmosphere is within the range of 1-15 m$^3$/h, and the humidity of the oxygen-containing atmosphere is less than or equal to 10 RH %;

the temperature T2 of the second sintering meets the following conditions: $250 \times (1+y) \leq T2 \leq 300 \times (3-y)°$ C., y denotes the content of Mn in the sodium-containing oxide cathode material;

the constant temperature time of the second sintering is within the range of 4-20 h;

the temperature rise rate of the second sintering is less than or equal to 10° C./min.

In the present disclosure, the coating agent M' is used for coating the sodium-containing oxide cathode material, so that the content of soluble alkali on the surface of the prepared sodium-containing oxide cathode material can be further reduced, thus the charge-discharge capacity, the cycle rate, the cycle life and the safety performance of the sodium ion batteries prepared with the cathode material can be further improved.

Further, the flow rate of the introduced oxygen-containing atmosphere is within the range of 2-8 m$^3$/h, and the humidity of the oxygen-containing atmosphere is less than or equal to 8 RH %;

the temperature T2 of the second sintering meets the following conditions: $275 \times (1+y) \leq T2 \leq 275 \times (3-y)°$ C., y denotes the content of Mn in the sodium-containing oxide cathode material;

the constant temperature time of the second sintering is within the range of 4-12 h;

the temperature rise rate of the second sintering is less than or equal to 8° C./min.

According to the present disclosure, the coating agent M' is used in an amount such that in the sodium-containing oxide cathode material, $0 \leq n(M')/n(Mn+Fe+M+M') \leq 0.1$, preferably $0 < n(M')/n(Mn+Fe+M+M') \leq 0.05$.

In the present disclosure, the coating agent M' is at least one selected from the group consisting of oxides, hydroxides, oxyhydroxides, phosphates, fluorides, borides, carbonates, and oxalates containing the element M'.

In a specific embodiment of the present disclosure, the method for preparing the sodium-containing oxide cathode material comprising the following steps:

S1-1, uniformly mixing an Mn oxide and/or an Mn hydroxide, a Fe oxide and/or a Fe hydroxide in a molar ratio of n(Mn):n(Fe)=y:z with a Na source and an additive M to obtain the sodium-manganese-iron-containing cathode material precursor;

S1-2, (i) preparing a mixed salt solution with an Mn salt and a Fe salt according to a molar ratio of n(Mn):n(Fe)=y:z; preparing a precipitating agent solution, a complexing agent solution, and an additive M solution with a precipitating agent, a complexing agent, and optionally an additive M respectively; introducing the mixed salt solution, the precipitating agent solution and the complexing agent solution into a reaction kettle in a concurrent flow, and carrying out a coprecipitation reaction to obtain a solid-liquid mixture, then filtering the solid-liquid mixture to obtain a filter cake, drying and sieving the filter cake to obtain an intermediate product;

(ii) uniformly blending the intermediate product, a sodium source, and an optional additive M to obtain the sodium-manganese-iron-containing cathode material precursor;

S2, subjecting a sodium-manganese-iron-containing cathode material precursor to first sintering, cooling, crushing, and sieving to obtain a first sintered product;

wherein an oxygen-containing atmosphere is introduced during the first sintering process;

the flow rate of the introduced oxygen-containing atmosphere is within the range of 1-15 m$^3$/h, and the humidity of the oxygen-containing atmosphere is less than or equal to 10 RH %;

the temperature T1 of the first sintering meets the following conditions: $500 \times (1+y) \leq T1 \leq 400 \times (3-y)°$ C., y denotes the content of Mn in the sodium-containing oxide cathode material;

the constant temperature time of the first sintering is within the range of 6-20 h;

the temperature rise rate of the first sintering is less than or equal to 10° C./min;

S3, uniformly mixing the first sintered product and a coating agent M', carrying out a second sintering, cooling, crushing, and sieving the sintered product to obtain a second sintered product;

wherein an oxygen-containing atmosphere is introduced during the second sintering process;

the flow rate of the introduced oxygen-containing atmosphere is within the range of 1-15 m$^3$/h, and the humidity of the oxygen-containing atmosphere is less than or equal to 10 RH %;

the temperature T2 of the second sintering meets the following conditions: 250×(1+y)≤T2≤300×(3−y)° C., y denotes the content of Mn in the sodium-containing oxide cathode material;

the constant temperature time of the second sintering is within the range of 4-20 h;

the temperature rise rate of the second sintering is less than or equal to 10° C./min;

S4, optionally, mixing and washing the second sintered product with a washing liquid, then filtering the mixture to obtain a filter cake, and drying the filter cake to obtain the sodium-containing oxide cathode material.

In the present disclosure, the second sintered material obtained in step S3 can be directly used as the sodium-containing oxide cathode material for preparing the sodium ion batteries. To further reduce the content of soluble alkali on the surface of the cathode material, the second sintered product is preferably washed according to step S4 to obtain the sodium-containing oxide cathode material.

In a third aspect, the present disclosure provides a sodium-containing oxide cathode material produced with the aforementioned preparation method.

The sodium-containing oxide cathode material provided by the present disclosure is used in the sodium ion batteries, so that the charge-discharge capacity, the cycle rate, the cycle life, and the safety performance of the sodium ion batteries can be significantly improved.

For example, when the sodium-containing oxide cathode material provided by the present disclosure is used in a 2025 button cell, in a charging and discharging voltage interval of 2-4.2V, the battery has 0.1 C charging and discharging capacity of more than or equal to 130 mAh/g, and a ratio of 1 C discharging capacity/0.1 C discharging capacity of more than or equal to 80%, preferably more than or equal to 85%.

Under the normal temperature, the capacity retention rate of the button cell after 100 charge-discharge cycles at 1 C is more than or equal to 85%, preferably more than or equal to 90%, and further preferably more than or equal to 92%.

In the fourth aspect, the present disclosure provides a positive electrode, wherein the positive electrode comprises at least 80 wt % of a sodium-containing oxide cathode material, based on the total weight of the positive electrode;

wherein the sodium-containing oxide cathode material is the aforementioned sodium-containing oxide cathode material.

Further, the positive electrode comprising at least 90 wt %, preferably at least 95 wt % of a sodium-containing oxide cathode material, based on the total weight of the positive electrode.

In the present disclosure, the positive electrode further comprises conventional auxiliary agents in the art, such as a conductive agent and a binder Polyvinylidene Fluoride (PVDF), both the kind and dosage of the conductive agent and the binder are not particularly limited, which may be conventional type and dosage in the art.

According to the present disclosure, the pole piece density of the positive electrode is more than or equal to 2.8 g/cm$^3$, preferably more than or equal to 3 g/cm$^3$, and further preferably more than or equal to 3.2 g/cm$^3$.

In the present disclosure, the pole piece density of the positive electrode is measured by weighing a mass of the active substance in the pole piece and dividing it by the area of the pole piece.

In a fifth aspect, the present disclosure provides a use of the above-mentioned sodium-containing oxide cathode material or the aforementioned positive electrode in the sodium ion batteries.

The present disclosure will be described in detail below with reference to examples.

In the following examples, all the raw materials were commercially available unless otherwise specified.

In the following examples, the pertinent properties were measured and obtained in the following manner:

phase test: obtained by testing with a SmartLab 9 kW model X-ray diffractometer manufactured by the Rigaku Corporation in Japan;

morphology test: measured with an S-4800 model scanning electron microscope manufactured by the Hitachi Corporation in Japan;

surface residual alkali test: measured by titrating with a Metrohmm888 professional Tirando intelligent potentiometric titrator;

specific surface area: obtained by testing with a specific surface tester having a model Tristar 113020 manufactured by the Micromeritics Corporation in the United States of America (USA);

tap density: measured by the testing with a tap density tester having a model BT-30 manufacture by the Baxter Company;

compacted density: measured by the testing with an MCP-PD51 model compacted density instrument Manufactured by the Mitsubishi Chemical Corporation in Japan;

thermal stability testing: the test results were obtained by measuring with a TGA-DSC3 model thermo-gravimetric analysis tester manufactured by Mettler Incorporation.

electrochemical performance testing: the electrochemical performance testing was performed on the 2025 type button cells at 25° C. using the Neware Battery Testing System. The prepared button cell was subjected to a charge and discharge test at a voltage range of 2-4.2V and the current of 0.1 C (0.1 C=140 mAh/g), the first charge and discharge specific capacity and the first cycle efficiency of the material were evaluated; the prepared button cell was subjected to the charge-discharge testing at the voltage range of 2-4.2V and the currents of 0.1 C, 0.2 C, 0.33 C, 0.5 C, 1 C and 2 C, respectively, the rate performance of the material is evaluated; the prepared button cell was subjected to 80 charge-discharge cycles at the voltage range of 2-4.1V and the current of 1 C, the cycle stability of the material was evaluated.

Example 1

(1) The manganese dioxide, ferric oxide, nickel protoxide, copper oxide, and sodium carbonate were accurately weighed according to the molar ratio 4:2:2:2:8 of manganese, iron, nickel, copper, and sodium elements, a proper amount of ethanol mixed medium was added, the materials were subjected to ball milling and uniform mixing to obtain a precursor Q1 for the sodium-manganese-iron-containing metal oxide cathode material.

(2) The uniformly mixed precursor Q1 was placed in a muffle furnace and heated at a temperature rise rate of 5° C./min from room temperature to 850° C. (y=0.4), the temperature was preserved for 15 h to perform the first sintering. During the first sintering process, the dry air with a humidity of less than 5 RH % was continuously introduced at a flow rate of 10 m$^3$/h. After the natural cooling of the first sintered product, crushing and sieving were carried out to prepare the sodium-containing metal oxide cathode material S1.

The preparation method of Examples 2-7 was similar to the preparation method of Example 1, refer to Table 1.

TABLE 1

|  | Example 1 | Example 2 | Example 3 | Example 4 |
|---|---|---|---|---|
| The preparation process of precursors ||||| 
| Manganese and iron species | $MnO_2$, $Fe_2O_3$ | $MnO_2$, $Fe_2O_3$ | $Mn_3O_4$, FeO | $Mn(OH)_2$, $Fe_3O_4$ |
| The ratio of Mn/Fe | 4:2 | 3:1 | 2:3 | 5:2 |
| Types of dopants | NiO, CuO | LiOH, MgO, $Co_2O_3$, $TiO_2$ | NiO, $Al_2O_3$, $Nb_2O_5$, $Y_2O_3$, $La_2O_3$ | ZnO, $AlF_3$, $MgCO_3$, $SrCO_3$, $Ru_2O_3$ |
| Dosage of element M | Ni/(Mn + Fe + M) = 0.2:1 Cu/(Mn + Fe + M) = 0.2:1 | Li/(Mn + Fe + M) = 0.1:1 Mg/(Mn + Fe + M) = 0.2:1 Co/(Mn + Fe + M) = 0.1:1 Ti/(Mn + Fe + M) = 0.2:1 | Ni/(Mn + Fe + M) = 0.1:1 Al/(Mn + Fe + M) = 0.1:1 Nb/(Mn + Fe + M) = 0.1:1 Y/(Mn + Fe + M) = 0.1:1 La/(Mn + Fe + M) = 0.1:1 | Zn/(Mn + FeM) = 0.1:1 Al/(Mn + Fe + M) = 0.05:1 Mg/(Mn + Fe + M) = 0.1:1 Sr/(Mn + Fe + M) = 0.025:1 Ru/(Mn + Fe + M) = 0.025:1 |
| Type of Na source | $Na_2CO_3$ | $Na_2CO_3$ | NaOH | NaF |
| Dosage of Na source | Na/(Mn + Fe + M) = 0.8:1 | Na/(Mn + Fe + M) = 1:1 | Na/(Mn + Fe + M) = 0.6:1 | Na/(Mn + Fe + M) = 0.7:1 |
| Mixed medium | Ethanol | Ethanol | Water | / |
| The preparation process of sodium-containing metal oxide cathode material ||||| 
| Sintering temperature | 850° C. | 950° C. | 750° C. | 875° C. |
| Temperature rise rate | 5° C./min | 3° C./min | 2° C./min | 10° C./min |
| Constant temperature time | 15 h | 10 h | 20 h | 6 h |
| Types of introduced gas | Air | Air | Oxygen gas | Air, oxygen gas |
| Flow rate | 10 $m^3$/h | 15 $m^3$/h | 5 $m^3$/h | Air and oxygen gas were 5 $m^3$/h respectively |
| The humidity of introduced gas | <5RH % | <10RH % | <3RH % | <5RH % |

|  | Example 5 | Example 6 | Example 7 |
|---|---|---|---|
| The preparation process of precursors |||| 
| Manganese and iron species | $Mn(OH)_2$, $Fe(OH)_3$ | $MnO_2$, $Fe_2O_3$ | $MnO_2$, $Fe_2O_3$ |
| The ratio of Mn/Fe | 3:3 | 4:2 | 6:1 |
| Types of dopants | $AlPO_4$, $Ti_3(PO_4)_4$, $Cu(OH)_2$, $Pr_2O_3$, $Ta_2O_5$, $W_2O_3$, | LiF, $Cu_2O$, CoOOH, $Sc_2O_3$, $MoO_3$, $Sm_2O_3$ | $Ni(OH)_2$, $Mg(OH)_2$, $TiB_2$, $ZrB_2$, $Re_2O_7$ |
| Dosage of element M | Al/(Mn + Fe + M) = 0.05:1 Ti/(Mn + Fe + M) = 0.1:1 Cu/(Mn + Fe + M) = 0.1:1 Pr/(Mn + Fe + M) = 0.05:1 Ta/(Mn + Fe + M) = 0.05:1 W/(Mn + Fe + M) = 0.05:1 | Li/(Mn + Fe + M) = 0.05:1 Cu/(Mn + Fe + M) = 0.1:1 Co/(Mn + Fe + M) = 0.05:1 Sc/(Mn + Fe + M) = 0.1:1 Mo/(Mn + Fe + M) = 0.05:1 Sm/(Mn + Fe + M) = 0.05:1 | Ni/(Mn + Fe + M) = 0.1:1 Mg/(Mn + Fe + M) = 0.1:1 Ti/(Mn + Fe + M) = 0.05:1 Zr/(Mn + Fe + M) = 0.025:1 Re/(Mn + Fe + M) = 0.025:1 |

TABLE 1-continued

| Type of Na source | NaCl | Na$_2$CO$_3$ | Na$_2$C$_2$O$_4$ |
|---|---|---|---|
| Dosage of Na source | Na/(Mn + Fe + M) = 0.8:1 | Na/(Mn + Fe + M) = 0.9:1 | Na/(Mn + Fe + M) = 0.75:1 |
| Mixed medium | / | Ethanol | Water |
| The preparation process of sodium-containing metal oxide cathode material | | | |
| Sintering temperature | 1000° C. | 900° C. | 900° C. |
| Temperature rise rate | 10° C./min | 5° C./min | 10° C./min |
| Constant temperature time | 12 h | 15 h | 15 h |
| Types of introduced gas | Air, oxygen gas | Air | Air |
| Flow rate | Air 10 m$^3$/h, oxygen gas 5 m$^3$/h | 10 m$^3$/h | 15 m$^3$/h |
| The humidity of introduced gas | <10RH % | <5RH % | <5RH % |

Unless otherwise specified in Table 1, the ratios and the dosage ratios referred to the molar ratios, and M denoted the total molar amount of the doped element.

Example 8

(1) The manganese sulfate, ferric sulfate, nickel sulfate, and copper sulfate were dissolved according to the molar ratio 4:2:2:2 of manganese, iron, nickel, copper to obtain a mixed salt solution with a concentration of 2 mol/L, sodium hydroxide was dissolved into a precipitating agent solution with a concentration of 2 mol/L, and ammonia water was dissolved into a complexing agent solution with a concentration of 3 mol/L. The precipitating agent solution, the complexing agent solution, and the mixed salt solution were added into a reaction kettle in a concurrent flow manner, the materials were reacted for 30 hours at the temperature of 45° C., a pH of 10.5 and a stirring speed of 700 rpm, the slurry was then subjected to suction filtration and washing, the filter cake was subjected to drying at the temperature of 120° C., and then sieving to obtain an intermediate product P8 represented by the chemical formula of $Mn_{0.4}Fe_{0.2}Ni_{0.2}Cu_{0.2}(OH)_2$. 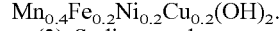

(2) Sodium carbonate and the intermediate product P8 were uniformly mixed to obtain a precursor Q8.

(3) The precursor Q8 was placed in a muffle furnace and heated at a temperature rise rate of 5° C./min from room temperature to 850° C. (y=0.4), the temperature was preserved for 15 h to perform the first sintering. During the first sintering process, the dry air with a humidity of 5 RH % was continuously introduced at a flow rate of 10 m$^3$/h. After the natural cooling of the first sintered product, crushing and sieving were carried out to prepare the sodium-containing metal oxide cathode material S8.

Specifically, the molar ratio of the used amount of the sodium carbonate in terms of Na element contained therein to the used amount of the precursor in terms of Mn, Fe, Ni, Cu element contained therein was n(Na)/n(Mn+Fe+Ni+Cu)= 0.85:1.

Example 9

The sodium carbonate, an intermediate product P8, titanium dioxide, magnesium oxide, and cobalt oxide were subjected to ball milling and uniformly mixing according to a certain proportion, the mixture was then placed in a muffle furnace, and heated at a temperature rise rate of 5° C./min from room temperature to 800° C. (y=0.08), the temperature was preserved for 15 h to perform the first sintering. During the first sintering process, the dry air with a humidity of 3 RH % was continuously introduced at a flow rate of 15 m$^3$/h. After the natural cooling of the first sintered product, crushing and sieving were carried out to prepare the sodium-containing metal oxide cathode material S9.

Specifically, the relationship of the molar ratios of the used amount of the sodium carbonate in terms of Na element contained therein to the used amount of the precursor in terms of Mn, Fe, Ni, and Cu element contained therein to the used amount of the additive in terms of Ti, Mg, Co element contained therein were as follows:
n(Na)/n(Mn+Fe+Ni+Cu+Ti+Mg+Co)=0.85:1,
n(Mn+Fe+Ni+Cu)/n(Mn+Fe+Ni+Cu+Ti+Mg+Co)=0.7:1,
n(Ti)/n(Mn+Fe+Ni+Cu+Ti+Mg+Co)=0.1:1,
n(Mg)/n(Mn+Fe+Ni+Cu+Ti+Mg+Co)=0.1:1,
n(Co)/n(Mn+Fe+Ni+Cu+Ti+Mg+Co)=0.1:1.

Example 10

(1) The manganese sulfate, ferric sulfate, nickel sulfate, and copper sulfate were dissolved according to the molar ratio 4:2:2:2 of manganese, iron, nickel, and copper to obtain a mixed salt solution with a concentration of 2 mol/L, sodium carbonate was dissolved into a precipitating agent solution with a concentration of 2 mol/L, and ammonia water was dissolved into a complexing agent solution with a concentration of 3 mol/L. The precipitating agent solution, the complexing agent solution, and the mixed salt solution were added into a reaction kettle in a concurrent flow manner, the materials were reacted for 20 hours at a temperature of 40° C., a pH of 8.2, and a stirring speed of 700 rpm, the slurry was then subjected to suction filtration and washing, the filter cake was subjected to drying at the temperature of 120° C., and then sieving to obtain an intermediate product P10 with represented by the chemical formula of $Mn_{0.4}Fe_{0.2}Ni_{0.2}Cu_{0.2}CO_3$.

(2) Sodium carbonate and the intermediate product P10 were uniformly mixed to obtain a precursor Q10.

(3) The precursor Q10 was placed in a muffle furnace and heated at a temperature rise rate of 5° C./min from room temperature to 950° C. (y=0.4), the temperature was preserved for 15 h to perform the first sintering. During the first sintering process, the dry air with a humidity of 5 RH % was continuously introduced at a flow rate of 15 m³/h. After the natural cooling of the first sintered product, crushing and sieving were carried out to prepare the sodium-containing metal oxide cathode material S10.

Specifically, the molar ratio of the used amount of the sodium carbonate in terms of Na element contained therein to the used amount of the precursor in terms of Mn, Fe, Ni, Cu element contained therein was n(Na)/n(Mn+Fe+Ni+Cu)= 0.8:1.

Example 11

The sodium-containing metal oxide cathode material S1 prepared in Example 1 was mixed with purified water in a beaker according to the mass ratio of 2:1, the mixture was stirred for 5 min at the temperature of 5° C. and the stirring speed of 200 rpm, the slurry was then rapidly suction filtered, the filter cake was subjected to drying in a vacuum oven at the temperature of 105° C., and subjected to sieving to obtain the sodium-containing metal oxide cathode material S11.

Example 12

The sodium-containing metal oxide cathode material S8 prepared in Example 8 was mixed with an acetic acid solution having a concentration of 0.1 mol/L in a beaker according to the mass ratio of 2:1, the mixture was stirred for 30 min at the temperature of 10° C. and the stirring speed of 200 rpm, the slurry was then rapidly suction filtered, the filter cake was subjected to drying in a vacuum oven at the temperature of 105° C., and subjected to sieving to obtain the sodium-containing metal oxide cathode material S12.

Example 13

The sodium-containing metal oxide cathode material S1 prepared in Example 1 and the coating agent titanium dioxide were subjected to ball milling and uniformly mixing according to a certain proportion, the mixture was then placed in a muffle furnace and heated at a temperature rise rate of 5° C./min from room temperature to 600° C. (y=0.36), the temperature was preserved for 10 h to perform a second sintering. During the second sintering process, the dry air with a humidity of 5 RH % was continuously introduced at a flow rate of 10 m³/h. After the natural cooling of the second sintered product, crushing and sieving were carried out to prepare the sodium-containing metal oxide cathode material S13.

Specifically, the molar ratio of the used amount of the titanium dioxide in terms of Ti element contained therein to the used amount of the precursor in terms of Mn, Fe, Ni, Cu element contained therein was n(Ti)/n(Mn+Fe+Ni+Cu+Ti)= 0.1:1.

Example 14

The sodium-containing metal oxide cathode material S8 prepared in Example 8 and zirconium fluoride were subjected to ball milling and uniformly mixing according to a certain proportion, the mixture was then placed in a muffle furnace and heated at a temperature rise rate of 3° C./min from room temperature to 700° C. (y=0.36), the temperature was preserved for 10 h to perform a second sintering. During the second sintering process, the dry air with a humidity of 5 RH % was continuously introduced at a flow rate of 10 m³/h. After the natural cooling of the second sintered product, crushing and sieving were carried out to prepare the sodium-containing metal oxide cathode material S14.

Specifically, the molar ratio of the used amount of the zirconium fluoride in terms of Zr element contained therein to the used amount of the precursor in terms of Mn, Fe, Ni, Cu element contained therein was n(Zr)/n(Mn+Fe+Ni+Cu+Zr)=0.1:1.

Example 15

The sodium-containing metal oxide cathode material S11 prepared in Example 11 and the coating agent niobium oxide were subjected to ball milling and uniformly mixing according to a certain proportion, the mixture was then placed in a muffle furnace and heated at a temperature rise rate of 5° C./min from room temperature to 600° C. (y=0.38), the temperature was preserved for 15 h to perform a second sintering. During the second sintering process, the dry air with a humidity of 10 RH % was continuously introduced at a flow rate of 10 m³/h. After the natural cooling of the second sintered product, crushing and sieving were carried out to prepare the sodium-containing metal oxide cathode material S15.

Specifically, the molar ratio of the used amount of the niobium oxide in terms of Nb element contained therein to the used amount of the precursor in terms of Mn, Fe, Ni, Cu element contained therein was n(Nb)/n(Mn+Fe+Ni+Cu+Nb)= 0.05:1.

Example 16

The sodium-containing metal oxide cathode material S10 prepared in Example 10, aluminum oxide and lanthanum oxide($La_2O_3$) were subjected to ball milling and uniformly mixing according to a certain proportion, the mixture was then placed in a muffle furnace and heated at a temperature rise rate of 3° C./min from room temperature to 650° C. (y=0.32), the temperature was preserved for 10 h to perform a second sintering. During the second sintering process, the dry air with a humidity of 5 RH % was continuously introduced at a flow rate of 10 m³/h. After the natural cooling of the second sintered product, crushing and sieving were carried out to prepare the sodium-containing metal oxide cathode material intermediate product.

The obtained sodium-containing metal oxide cathode material intermediate product was mixed with an ammonium sulfate solution with the concentration of 0.1 mol/L in a beaker according to the mass ratio of 1:1, the mixture was stirred for 10 min at the temperature of 3° C. and the stirring speed of 500 rpm, the slurry was then rapidly suction filtered, the filter cake was subjected to drying in a vacuum oven at the temperature of 105° C., and subjected to sieving to obtain the sodium-containing metal oxide cathode material S16.

Specifically, the molar ratios of the used amount of the aluminum oxide in terms of Al element contained therein and the used amount of the lanthanum oxide in terms of La element contained therein to the used amount of the precursor in terms of Mn, Fe, Ni, Cu element contained therein were as follows: n(Al)/n(Mn+Fe+Ni+Cu+Al+La)=0.1:1, and n(La)/n(Mn+Fe+Ni+Cu+Al+La)=0.1:1.

Example 17

The sodium-containing metal oxide cathode material was prepared according to a similar method as that in Example 1, except that the nickel protoxide and copper oxide were not added in step (1), the sodium-containing metal oxide cathode material S17 was prepared by accurately weighing and mixing according to the molar ratio 6:4:8 of manganese, iron and sodium elements.

Comparative Example 1

The sodium-containing metal oxide cathode material was prepared according to a similar method as that in Example 1, except that the dry air with a humidity of 30 RH % was continuously introduced at a flow rate of 10 m³/h during the sintering process in step (2), the sodium-containing metal oxide cathode material $D_1$ was prepared.

Comparative Example 2

The sodium-containing metal oxide cathode material was prepared according to a similar method as that in Example 8, except that the heat preservation time in step (2) was reduced to 3 h, the dry air was not introduced during the sintering process, the sodium-containing metal oxide cathode material $D_2$ was prepared.

The compositions of the sodium-containing oxide cathode materials prepared in Examples and Comparative Examples were shown in Table 2.

TABLE 2

| Cathode materials | Composition |
|---|---|
| S1 | $Na_{0.8}(Mn_{0.4}Fe_{0.2}Ni_{0.2}Cu_{0.2})O_2$ |
| S2 | $Na_1(Mn_{0.3}Fe_{0.1}Li_{0.1}Mg_{0.2}Co_{0.1}Ti_{0.2})O_2$ |
| S3 | $Na_{0.6}(Mn_{0.2}Fe_{0.3}Ni_{0.1}Al_{0.1}Nb_{0.1}Y_{0.1}La_{0.1})O_2$ |
| S4 | $Na_{0.7}(Mn_{0.5}Fe_{0.3}Zn_{0.1}Al_{0.05}Mg_{0.1}Sr_{0.025}Ru_{0.025})O_{1.9}F_{0.1}$ |
| S5 | $Na_{0.8}(Mn_{0.3}Fe_{0.3}Al_{0.05}Ti_{0.1}Cu_{0.1}Pr_{0.05}Ta_{0.05}W_{0.05})O_2$ |
| S6 | $Na_{0.9}(Mn_{0.4}Fe_{0.2}Li_{0.05}Cu_{0.1}Co_{0.05}Sc_{0.1}Mo_{0.05}Sm_{0.05})O_2$ |
| S7 | $Na_{0.75}(Mn_{0.6}Fe_{0.1}Ni_{0.1}Mg_{0.1}Ti_{0.05}Zr_{0.025}Re_{0.025})O_2$ |
| S8 | $Na_{0.85}(Mn_{0.4}Fe_{0.2}Ni_{0.2}Cu_{0.2})O_2$ |
| S9 | $Na_{0.85}(Mn_{0.28}Fe_{0.14}Ni_{0.14}Cu_{0.14}Ti_{0.1}Mg_{0.1}Co_{0.1})O_2$ |
| S10 | $Na_{0.8}(Mn_{0.4}Fe_{0.2}Ni_{0.2}Cu_{0.2})O_2$ |
| S11 | $Na_{0.8}(Mn_{0.4}Fe_{0.2}Ni_{0.2}Cu_{0.2})O_2$ |
| S12 | $Na_{0.85}(Mn_{0.4}Fe_{0.2}Ni_{0.2}Cu_{0.2})O_2$ |
| S13 | $Na_{0.8}(Mn_{0.36}Fe_{0.18}Ni_{0.18}Cu_{0.18})Ti_{0.1}O_2$ |
| S14 | $Na_{0.85}(Mn_{0.36}Fe_{0.18}Ni_{0.18}Cu_{0.18})Zr_{0.1}O_{1.98}F_{0.02}$ |
| S15 | $Na_{0.8}(Mn_{0.38}Fe_{0.19}Ni_{0.19}Cu_{0.19})Nb_{0.05}O_2$ |
| S16 | $Na_{0.8}(Mn_{0.32}Fe_{0.16}Ni_{0.16}Cu_{0.16})Al_{0.1}La_{0.1}O_2$ |
| S17 | $Na_{0.8}(Mn_{0.6}Fe_{0.4})O_2$ |
| D1 | $Na_{0.8}(Mn_{0.4}Fe_{0.2}Ni_{0.2}Cu_{0.2})O_2$ |
| D2 | $Na_{0.85}(Mn_{0.4}Fe_{0.2}Ni_{0.2}Cu_{0.2})O_2$ |

The structures and properties of the sodium-containing oxide cathode materials prepared in Examples and Comparative Examples were shown in Table 3.

TABLE 3

| Cathode material | $FWHM_{(003)}$ | $FWHM_{(104)}$ | $FWHM_{(003)}/FWHM_{(104)}$ | $S_{(003)}/S_{(104)}$ |
|---|---|---|---|---|
| S1 | 0.14 | 0.17 | 0.82 | 0.83 |
| S2 | 0.18 | 0.22 | 0.82 | 0.70 |
| S3 | 0.17 | 0.30 | 0.57 | 0.92 |
| S4 | 0.13 | 0.26 | 0.50 | 1.46 |
| S5 | 0.16 | 0.23 | 0.70 | 1.21 |
| S6 | 0.19 | 0.25 | 0.76 | 0.96 |
| S7 | 0.10 | 0.16 | 0.63 | 1.50 |
| S8 | 0.22 | 0.20 | 1.10 | 0.82 |
| S9 | 0.26 | 0.28 | 0.93 | 0.56 |
| S10 | 0.23 | 0.40 | 0.58 | 0.68 |
| S11 | 0.20 | 0.37 | 0.54 | 0.75 |
| S12 | 0.22 | 0.35 | 0.63 | 0.76 |
| S13 | 0.21 | 0.36 | 0.58 | 0.84 |
| S14 | 0.18 | 0.21 | 0.86 | 0.92 |
| S15 | 0.14 | 0.18 | 0.78 | 1.11 |
| S16 | 0.16 | 0.20 | 0.80 | 0.88 |
| S17 | 0.14 | 0.18 | 0.78 | 0.76 |
| D1 | 0.26 | 0.35 | 0.74 | 0.56 |
| D2 | 0.32 | 0.42 | 0.76 | 0.45 |

| Cathode material | Residual alkali on the surface [$m(Na_2CO_3) + m(NaOH)$]$_0$ ppm | $m(Na_2CO_3)_0/m(NaOH)_0$ | Specific surface area m²/g | Tap density g/cm³ | Compacted density g/cm³ | Thermal decomposition temperature °C |
|---|---|---|---|---|---|---|
| S1 | 11200 | 0.25 | 0.51 | 1.88 | 2.91 | 288 |
| S2 | 14900 | 0.28 | 0.55 | 1.80 | 2.78 | 280 |
| S3 | 5200 | 0.14 | 0.65 | 1.82 | 2.82 | 291 |
| S4 | 6810 | 0.23 | 0.73 | 1.78 | 2.88 | 290 |
| S5 | 9650 | 0.26 | 0.50 | 1.91 | 2.95 | 289 |
| S6 | 12350 | 0.35 | 0.57 | 1.90 | 3.10 | 287 |
| S7 | 11000 | 0.41 | 0.50 | 2.02 | 3.20 | 288 |
| S8 | 8200 | 0.32 | 2.82 | 1.53 | 2.68 | 291 |
| S9 | 8750 | 0.26 | 1.86 | 1.65 | 2.72 | 290 |
| S10 | 8520 | 0.25 | 2.32 | 1.59 | 2.70 | 291 |
| S11 | 6360 | 0.38 | 3.89 | 1.22 | 2.50 | 293 |
| S12 | 4530 | 0.60 | 3.65 | 1.30 | 2.63 | 295 |
| S13 | 7520 | 0.32 | 1.90 | 1.78 | 2.81 | 290 |
| S14 | 6670 | 0.35 | 1.83 | 1.82 | 2.85 | 291 |
| S15 | 4830 | 0.31 | 1.71 | 1.80 | 2.82 | 296 |
| S16 | 3680 | 0.96 | 1.74 | 1.86 | 2.87 | 297 |

TABLE 3-continued

| | | | | | |
|---|---|---|---|---|---|
| S17 | 14920 | 0.37 | 0.55 | 1.87 | 2.90 | 287 |
| D1 | 137600 | 0.28 | 0.37 | 1.35 | 2.45 | 262 |
| D2 | 171910 | 1.12 | 0.48 | 1.67 | 2.72 | 258 |

As illustrated by Table 1, Table 2 and Table 3, Examples S1-S17 have smaller $FWHM_{(003)}$ and $FWHM_{(104)}$ and larger $S_{(003)}/S_{(104)}$ than Comparative Examples $D_1$ and $D_2$, indicating that the sodium-containing oxide cathode materials provided by the present disclosure have better crystallinity and structural stability; Examples S1-S17 have significantly lower $m(Na_2CO_3)+m(NaOH)$ content than the Comparative Examples $D_1$ and $D_2$, indicating that the sodium-containing oxide cathode materials provided by the present disclosure have a lower content of soluble alkali on the surface; Examples S1-S17 have smaller specific surface area than Comparative Examples $D_1$ and $D_2$, indicating that the sodium-containing oxide cathode materials provided by the present disclosure have higher reaction activity, which is more beneficial to deintercalation of sodium ions and the exertion of high capacity and rate performance; Examples S1-S17 have higher tap density and compacted density than Comparative Examples $D_1$ and $D_2$, indicating that the sodium-containing oxide cathode materials provided by the present disclosure are conducive to the preparation of a cathode pole piece with a high electrode density, and improvement of the energy density of the battery; Examples S1-S17 have higher thermal decomposition temperatures than Comparative Examples $D_1$ and $D_2$, indicating that the sodium-containing oxide cathode materials provided by the present disclosure have a higher safety. As shown from the comparison of $m(Na_2CO_3)+m(NaOH)$ between sodium-containing oxide cathode material S10 in Example 10 and sodium-containing oxide cathode material S16 in Example 16, the comparison of $m(Na_2CO_3)+m(NaOH)$ between sodium-containing oxide cathode material S11 in Example 11 and sodium-containing oxide cathode material S15 in Example 15, the comparison of $m(Na_2CO_3)+m(NaOH)$ between sodium-containing oxide cathode material S13 in Example 13 and sodium-containing oxide cathode material S1 in Example 1, indicating that the coating can significantly reduce the content of soluble alkali in the materials. The comparison of $m(Na_2CO_3)+m(NaOH)$ between sodium-containing oxide cathode material S1 in Example 1 and sodium-containing oxide cathode material S17 in Example 17 indicating that the doping of elements can reduce the content of soluble alkali in the materials. The comparison of $m(Na_2CO_3)+m(NaOH)$ between sodium-containing oxide cathode material S12 in Example 12 and sodium-containing oxide cathode material S8 in Example 8, the comparison of $m(Na_2CO_3)+m(NaOH)$ between sodium-containing oxide cathode material S11 in Example 11 and sodium-containing oxide cathode material S1 in Example 1, indicating that the water washing or the acidic solution treatment can further significantly reduce the content of soluble alkali in the materials.

FIG. 1, FIG. 2, FIG. 3 and FIG. 4 show the XRD pattern of the sodium-containing oxide cathode material prepared in Example 1, Example 12, Example 14, and Comparative Example 2, respectively; as can be seen from FIGS. 1-4, $S_{(003)}/S_{(104)}$ of Example 1 is 0.83, $S_{(003)}/S_{(104)}$ of Example 12 is 0.76, $S_{(003)}/S_{(104)}$ of Example 14 is 0.92, each is larger than that of the Comparative Example 2 (its $S_{(003)}/S_{(104)}$ is 0.45).

Figure 5:
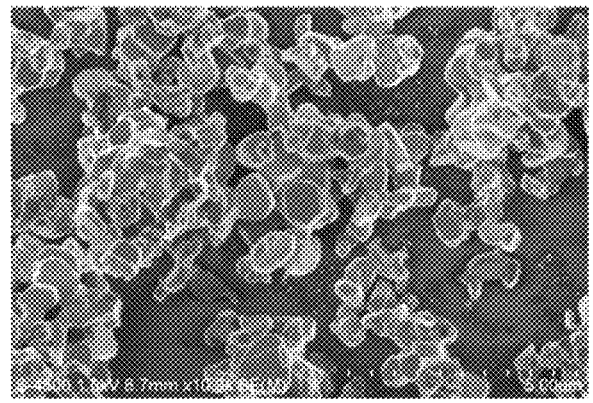
FIG. 5 illustrates a Scanning Electron Microscope (SEM) image of the sodium-containing oxide cathode material prepared in Example 1.
Figure 6:
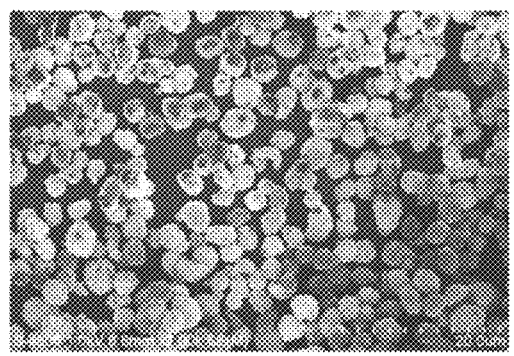
FIG. 6 illustrates an SEM image of the sodium-containing oxide cathode material prepared in Example 8.
Figure 7:
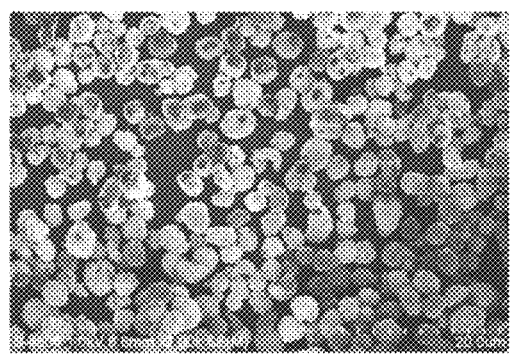
FIG. 7 illustrates an SEM image of the sodium-containing oxide cathode material prepared in Comparative Example 2.
Figure 8:
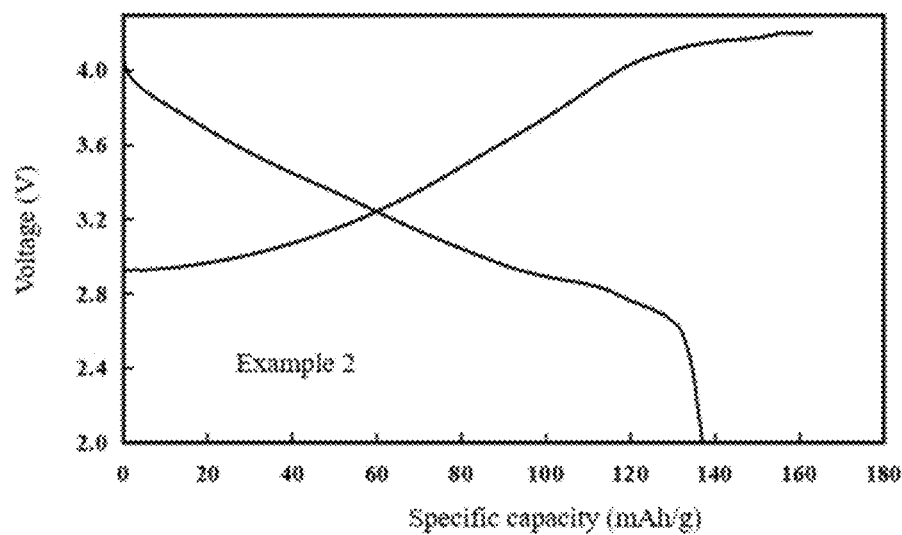
FIG. 8 shows the first charge and discharge curve of the sodium ion batteries assembled with the cathode materials prepared in Example 2.
Figure 9:
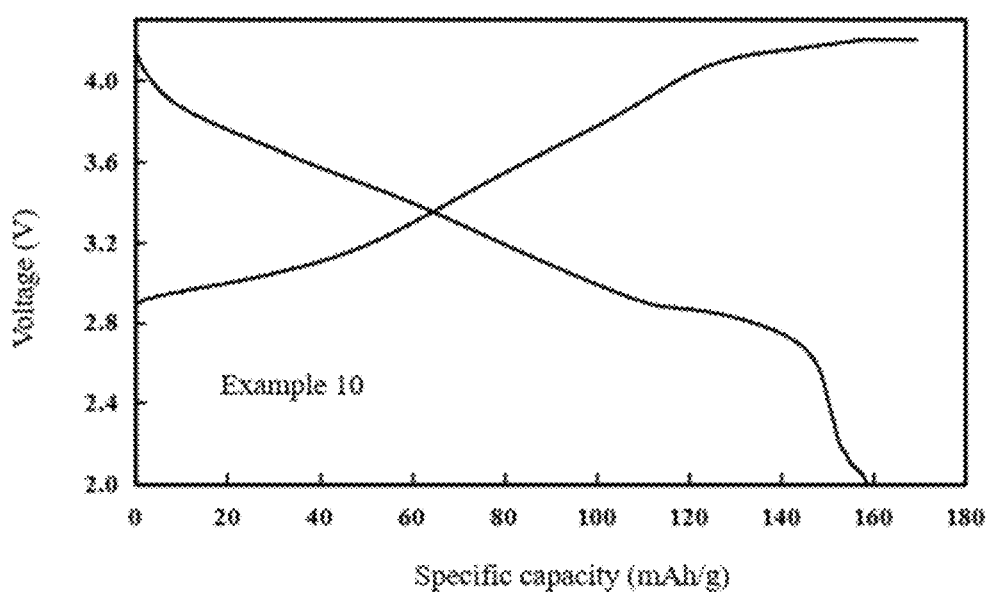
FIG. 9 shows the first charge and discharge curve of the sodium ion batteries assembled with the cathode materials prepared in Example 10.
Figure 10:
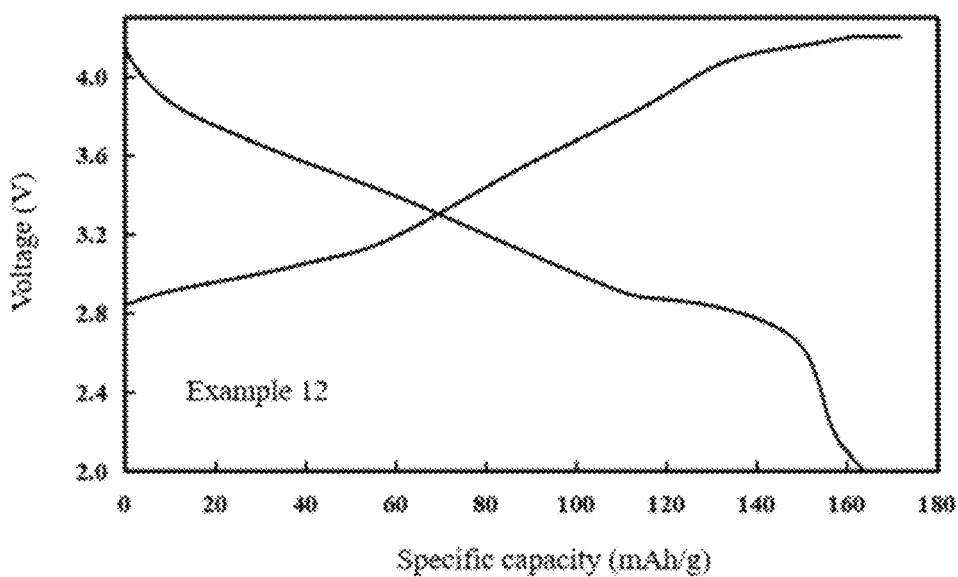
FIG. 10 shows the first charge and discharge curve of the sodium ion batteries assembled with the cathode materials prepared in Example 12.
Figure 11:
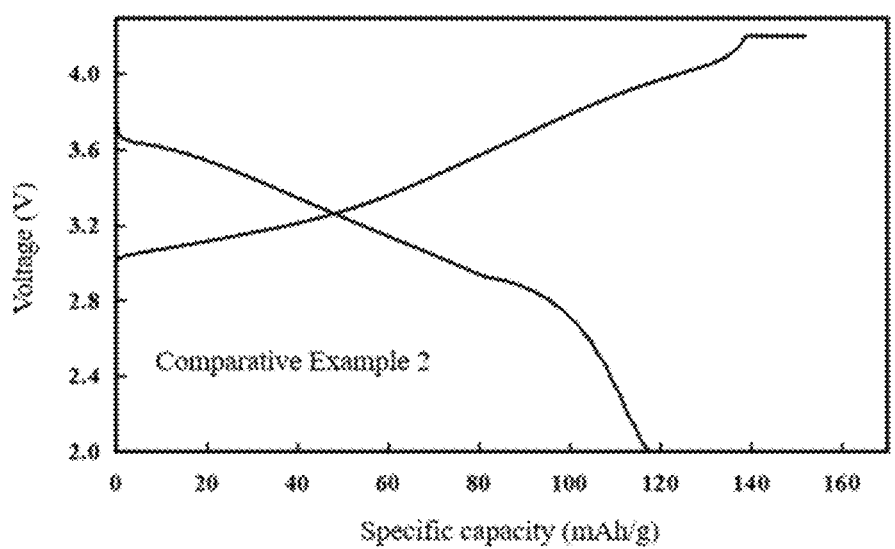
FIG. 11 shows the first charge and discharge curve of the sodium ion batteries assembled with the cathode materials prepared in Comparative Example 2.
Figure 12:
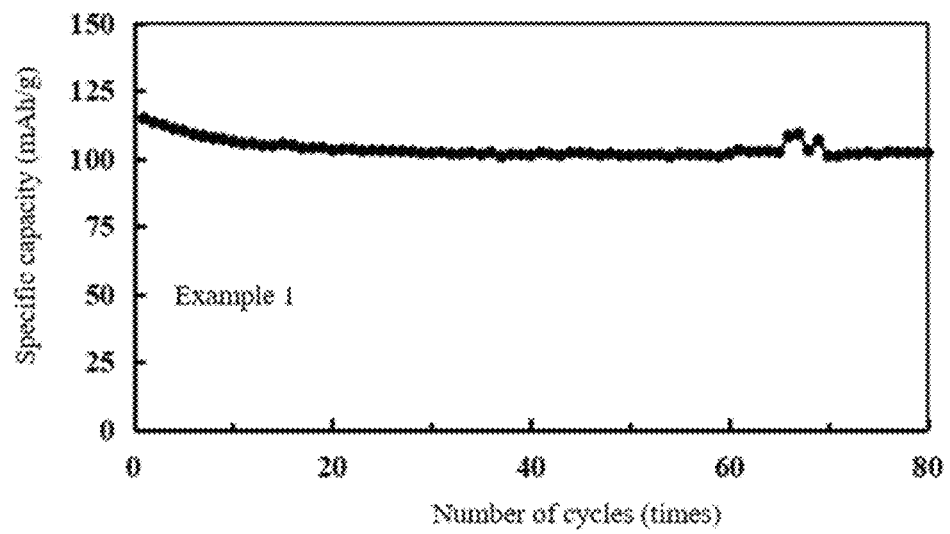
FIG. 12 is a graph showing the cycle stability of the sodium ion batteries assembled with the cathode materials prepared in Example 1.
Figure 13:
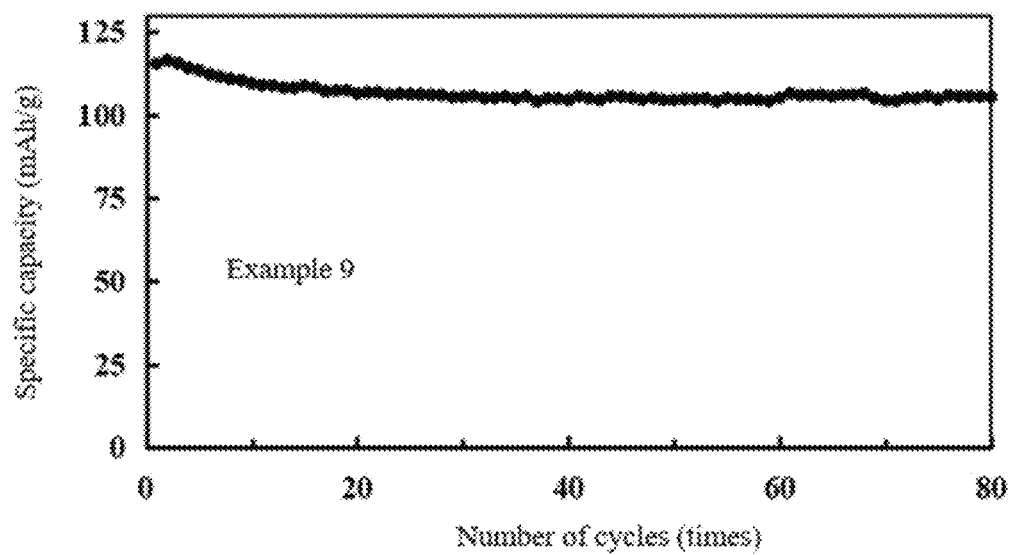
FIG. 13 is a graph showing the cycle stability of the sodium ion batteries assembled with the cathode materials prepared in Example 9.
Figure 14:
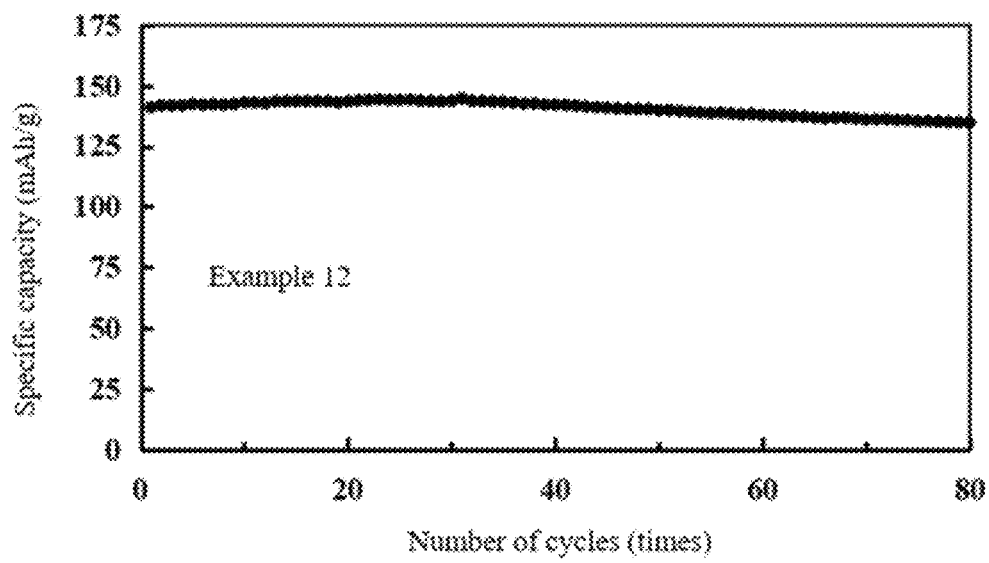
FIG. 14 is a graph showing the cycle stability of the sodium ion batteries assembled with the cathode materials prepared in Example 12.
Figure 15:
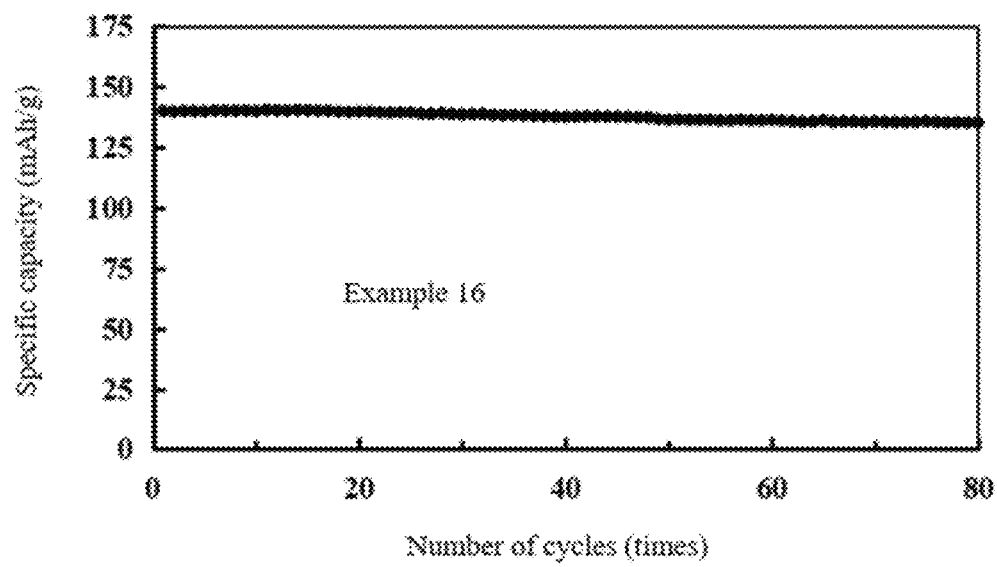
FIG. 15 is a graph showing the cycle stability of the sodium ion batteries assembled with the cathode materials prepared in Example 16.
Figure 16:
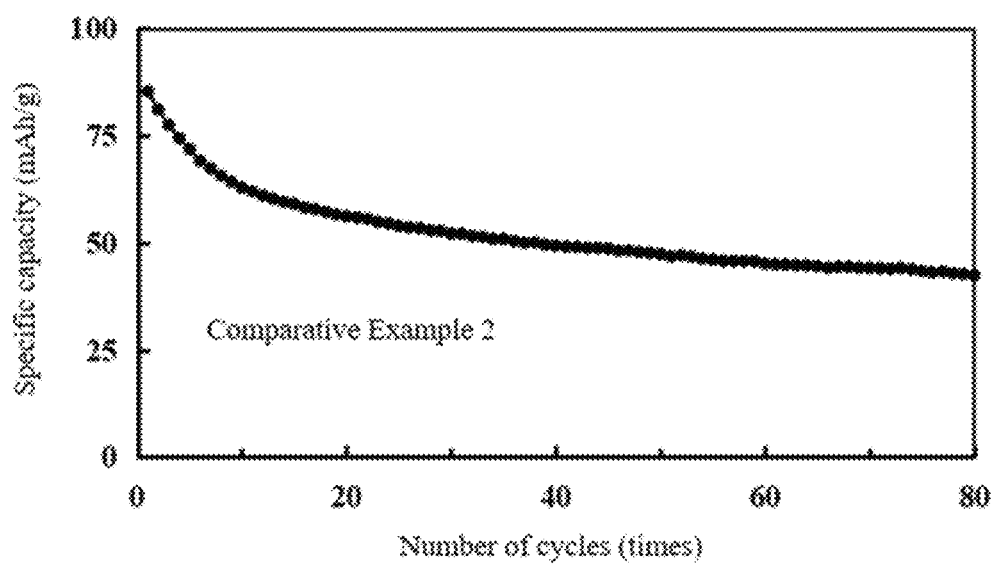
FIG. 16 is a graph showing the cycle stability of the sodium ion batteries assembled with the cathode materials prepared in Comparative Example 2.

FIG. 5, FIG. 6, and FIG. 7 illustrate the SEM image of the sodium-containing oxide cathode material prepared in Example 1, Example 8, and Comparative Example 2, respectively, as can be seen from FIGS. 5-7 that the sodium-containing oxide cathode material provided in Example 1 has a uniform distribution, smooth surface, and good crystallinity; the sodium-containing oxide cathode material provided in Example 8 has a spherical shape, uniform distribution, and exhibits desirable sphericity; the sodium-containing oxide cathode material prepared in Comparative Example 2 has an uneven distribution of particles, rough surface, and poor crystallinity.

Test Example 1

The sodium-containing oxide cathode materials prepared in the Examples and Comparative Examples were placed in a muffle furnace, respectively, and heated at a temperature rise rate of 5° C./min from room temperature to 600° C., the temperature was preserved for 10 h to perform a sintering process. During the sintering process, the air with a humidity of 25 RH % was continuously introduced at a flow rate of 10 m³/h. After natural cooling of the sintered product, crushing and sieving were carried out, the treated sodium-containing oxide cathode materials were obtained, the content of soluble residual alkali on the surface was measured, and the results were shown in Table 4.

TABLE 4

| | Residual alkali on the surface [0] | | Residual alkali on the surface [1] | | Variation value | |
|---|---|---|---|---|---|---|
| Cathode material | $[m(Na_2CO_3) + m(NaOH)]_0$ ppm | $m(Na_2CO_3)_0/ m(NaOH)_0$ | $[m(Na_2CO_3) + m(NaOH)]_1$ ppm | $m(Na_2CO_3)_1/ m(NaOH)_1$ | $\Delta\lambda[m(Na_2CO_3) + m(NaOH)]$ % | $\Delta\lambda[m(Na_2CO_3)/ m(NaOH)]$ % |
| S1 | 11200 | 0.25 | 10300 | 0.31 | 8 | 24 |
| S2 | 14900 | 0.28 | 13700 | 0.37 | 8.1 | 32.1 |
| S3 | 5200 | 0.14 | 5100 | 0.16 | 1.9 | 14.3 |
| S4 | 6810 | 0.23 | 6530 | 0.27 | 4.1 | 17.4 |
| S5 | 9650 | 0.26 | 8860 | 0.27 | 8.2 | 3.8 |
| S6 | 12350 | 0.35 | 11730 | 0.39 | 5 | 11.4 |
| S7 | 11000 | 0.41 | 10290 | 0.53 | 6.5 | 29.3 |
| S8 | 8200 | 0.32 | 7760 | 0.33 | 5.4 | 3.1 |
| S9 | 8750 | 0.26 | 8120 | 0.28 | 7.2 | 7.7 |
| S10 | 8520 | 0.25 | 7760 | 0.28 | 8.9 | 12 |

TABLE 4-continued

| Cathode material | Residual alkali on the surface [0] | | Residual alkali on the surface [1] | | Variation value | |
|---|---|---|---|---|---|---|
| | $[m(Na_2CO_3) + m(NaOH)]_0$ ppm | $m(Na_2CO_3)_0/ m(NaOH)_0$ | $[m(Na_2CO_3) + m(NaOH)]_1$ ppm | $m(Na_2CO_3)_1/ m(NaOH)_1$ | $\Delta\lambda[m(Na_2CO_3) + m(NaOH)]$ % | $\Delta\lambda[m(Na_2CO_3)/ m(NaOH)]$ % |
| S11 | 6360 | 0.38 | 5910 | 0.41 | 7.1 | 7.9 |
| S12 | 4530 | 0.60 | 4430 | 0.72 | 2.2 | 20 |
| S13 | 7520 | 0.32 | 7120 | 0.37 | 5.3 | 15.6 |
| S14 | 6670 | 0.35 | 6360 | 0.38 | 4.6 | 8.6 |
| S15 | 4830 | 0.31 | 4800 | 0.33 | 0.6 | 6.5 |
| S16 | 3680 | 0.96 | 3530 | 1 | 4.1 | 4.2 |
| S17 | 14920 | 0.37 | 13570 | 0.41 | 9 | 10.8 |
| D1 | 137600 | 0.28 | 55490 | 0.77 | 59.7 | 175 |
| D2 | 171910 | 1.12 | 94420 | 1.96 | 45.1 | 75 |

As can be seen from Table 4, both the absolute content change $\Delta\lambda[m(Na_2CO_3)+m(NaOH)]$ and the proportional content change $\Delta\lambda[m(Na_2CO_3)/m(NaOH)]$ of soluble alkali on the surface of sodium-containing oxide cathode materials S1-S17 provided by the present disclosure after heat treatment under the conditions of high humidity (air with the humidity of 25 RH %) and high temperature (600° C.) condition are significantly smaller than those of the Comparative Examples $D_1$ and $D_2$, indicating that the sodium-containing oxide positive materials provided by the present disclosure have a stable surface structure, and are not easily reacted with air, the sodium hydroxide on the cathode material surface can hardly converted to sodium carbonate even under the conditions of high humidity (air with the humidity of 25 RH %) and high temperature (600° C.), indicating that the cathode materials provided by the present disclosure have excellent surface structure stability.

Test Example 2

The sodium-containing oxide cathode materials prepared in the Examples and Comparative Examples were placed in a muffle furnace, respectively, and heated at a temperature rise rate of 5° C./min from room temperature to 900° C., the temperature was preserved for 10 h to perform a sintering process. During the sintering process, the air with a humidity of 30 RH % was continuously introduced at a flow rate of 15 m³/h. After natural cooling of the sintered product, crushing and sieving were carried out, the treated sodium-containing oxide cathode materials were obtained, the content of soluble residual alkali on the surface was measured, and the results were shown in Table 5.

TABLE 5

| Cathode material | Residual alkali on the surface [0] | | Residual alkali on the surface [1] | | Variation value/% | |
|---|---|---|---|---|---|---|
| | $[m(Na_2CO_3) + m(NaOH)]_0$ ppm | $m(Na_2CO_3)_0/ m(NaOH)_0$ | $[m(Na_2CO_3) + m(NaOH)]_1$ ppm | $m(Na_2CO_3)_1/ m(NaOH)_1$ | $\Delta\lambda[m(Na_2CO_3) + m(NaOH)]$ % | $\Delta\lambda[m(Na_2CO_3)/ m(NaOH)]$ % |
| S1 | 11200 | 0.25 | 10000 | 0.30 | 10.7 | 20 |
| S2 | 14900 | 0.28 | 13110 | 0.35 | 12 | 25 |
| S3 | 5200 | 0.14 | 4930 | 0.15 | 5.2 | 7.1 |
| S4 | 6810 | 0.23 | 6330 | 0.26 | 7 | 13 |
| S5 | 9650 | 0.26 | 8450 | 0.26 | 12.4 | 0 |
| S6 | 12350 | 0.35 | 10430 | 0.37 | 15.5 | 5.7 |
| S7 | 11000 | 0.41 | 9790 | 0.48 | 11 | 17.1 |
| S8 | 8200 | 0.32 | 7460 | 0.32 | 9 | 0 |
| S9 | 8750 | 0.26 | 7920 | 0.27 | 9.5 | 3.8 |
| S10 | 8520 | 0.25 | 7560 | 0.27 | 11.3 | 8 |
| S11 | 6360 | 0.38 | 5810 | 0.40 | 8.6 | 5.3 |
| S12 | 4530 | 0.60 | 4330 | 0.68 | 4.4 | 13.3 |
| S13 | 7520 | 0.32 | 6980 | 0.35 | 7.2 | 9.4 |
| S14 | 6670 | 0.35 | 6160 | 0.35 | 7.6 | 0 |
| S15 | 4830 | 0.31 | 4630 | 0.32 | 4.1 | 3.2 |
| S16 | 3680 | 0.96 | 3480 | 0.97 | 5.4 | 1 |
| S17 | 14920 | 0.37 | 12870 | 0.40 | 13.7 | 8.1 |
| D1 | 137600 | 0.28 | 50290 | 0.48 | 63.5 | 71.4 |
| D2 | 171910 | 1.12 | 89420 | 1.76 | 48 | 57.1 |

As can be seen from Table 5, both the absolute content change Δλ[m(Na$_2$CO$_3$)+m(NaOH)] and the proportional content change Δλ[m(Na$_2$CO$_3$)/m(NaOH)] of soluble alkali on the surface of sodium-containing oxide cathode materials S1-S17 provided by the present disclosure after heat treatment under the conditions of high humidity (air with the humidity of 30 RH %) and high temperature (900° C.) condition are significantly smaller than those of the Comparative Examples D$_1$ and D$_2$, indicating that the sodium-containing oxide positive materials provided by the present disclosure have a stable surface structure, and are not easily reacted with air, the sodium hydroxide on the cathode material surface can hardly converted to sodium carbonate even under the conditions of high humidity (air with the humidity of 30 RH %) and high temperature (900° C.), indicating that the cathode materials provided by the present disclosure have excellent surface structure stability. As can be seen from the comparison of m(Na$_2$CO$_3$)$_1$/m(NaOH)$_1$ in Table 4 and Table 5, the sodium-containing oxide cathode materials S1-S17 provided by the present disclosure have a very small decrease of the value m(Na$_2$CO$_3$)$_1$/m(NaOH)$_1$ when the heat treatment temperature is raised from 600° C. to 900° C., indicating that even at very high treatment temperatures (900° C.), only a very small amount of Na$_2$CO$_3$ participates in the reaction to allow Na to enter the material lattice, whereas Comparative Examples D$_1$ and D$_2$ have a large decrease of the value m(Na$_2$CO$_3$) 1/m(NaOH)$_1$ when the heat treatment temperature is raised from 600° C. to 900° C., indicating that a large amount of Na$_2$CO$_3$ participates in the reaction to allow Na to enter the material lattice under the high temperature, indicating that the cathode materials provided by the present disclosure have a stable internal structure, and the residual alkali on the surface of the cathode materials can hardly react and enter the material bulk phase even at the high temperature.

APPLICATION EXAMPLE

Preparing the pole piece: the sodium-containing metal oxide cathode materials prepared in the Examples and Comparative Examples, carbon black and polyvinylidene fluoride (PVDF) according to the mass ratio of 90%: 5%: 5% were sufficiently mixed with a suitable amount of N-methyl pyrrolidone to form the uniform slurry, which was coated on an aluminum foil, then subjected to drying at 120° C., rolling, punching and shearing, the aluminum foil was punched into a positive electrode with the diameter of 11 mm by using the pressure of 100 MPa, the positive electrode was then put into a vacuum oven for drying at 120° C. for 12 hours. The properties of the positive electrode were shown in Table 6.

Assembling the battery: the 2025 type button cell was assembled in a glove box filled with argon gas by using a sodium sheet as a negative electrode, a polypropylene microporous membrane as a diaphragm (Celgard 2400), and NaPF$_6$ with a concentration of 1 mol/L as an electrolyte. The electrochemical properties of the produced batteries were shown in Table 7.

TABLE 6

| Cathode materials | Pole piece density/g/cm$^3$ |
| --- | --- |
| S1 | 3.1 |
| S2 | 3.1 |
| S3 | 3.1 |
| S4 | 3.1 |
| S5 | 3.2 |
| S6 | 3.2 |
| S7 | 3.2 |
| S8 | 3 |
| S9 | 3 |
| S10 | 3 |
| S11 | 2.8 |
| S12 | 2.8 |
| S13 | 3 |
| S14 | 3 |
| S15 | 3 |
| S16 | 3 |
| S17 | 3.2 |
| D1 | 2.5 |
| D2 | 2.6 |

As shown by Table 6, the positive electrodes made from the cathode materials provided by Examples S1-S17 have a higher pole piece density than those made from the cathode materials provided by Comparative Examples 1 and 2, the use of the positive electrodes in the sodium ion batteries can significantly improve the energy density thereof.

TABLE 7

| Cathode material | 0.1 C discharge capacity mAh/g | 1 C discharge capacity/0.1 C discharge capacity % | Capacity retention rate after 80 charge-discharge cycles at the current of 1 C % |
| --- | --- | --- | --- |
| S1 | 138.5 | 84.2 | 88.6 |
| S2 | 137.2 | 84 | 89 |
| S3 | 143.6 | 84.7 | 89.2 |
| S4 | 141.3 | 85.2 | 90.6 |
| S5 | 143.5 | 85 | 92.6 |
| S6 | 143.9 | 85.1 | 93.1 |
| S7 | 138.6 | 84 | 91.5 |
| S8 | 152.6 | 85.8 | 92.3 |
| S9 | 160.6 | 87.2 | 94.5 |
| S10 | 158.7 | 86.8 | 91.7 |
| S11 | 143.6 | 84.7 | 92.2 |
| S12 | 163.7 | 86.5 | 95.7 |
| S13 | 143.5 | 86.2 | 91.1 |
| S14 | 158.4 | 86.9 | 93.5 |
| S15 | 143.9 | 85.2 | 93.3 |
| S16 | 165.8 | 87.7 | 96 |
| S17 | 136 | 82.1 | 85.1 |
| D1 | 122.1 | 65.1 | 77.2 |
| D2 | 116.1 | 73.7 | 51.8 |

As shown by Table 7, the sodium ion batteries assembled with the positive electrodes made from the cathode materials provided by Examples S1-S17 have a higher specific discharge capacity and better rate performance and cycle stability than those of Comparative Examples 1 and 2.

Relative to Example 1, the reason for the capacity reduction in Comparative Example 1 may be the excessively high content of the soluble alkali on the surface; Comparative Example 2 differs from Example 8 in that the dry gas is not introduced and the too short sintering time, it causes that the content of soluble alkali on the surface of the material prepared in Comparative Example 2 is too high, and the crystallinity is unsuitable, thereby resulting in poorer electrochemical properties thereof.

FIG. 8, FIG. 9, FIG. 10, and FIG. 11 show the first discharge and discharge curves of the sodium ion batteries assembled with the positive electrodes made from the sodium-containing oxide cathode materials prepared in Example 2, Example 10, Example 12, and Comparative Example 2, respectively; as illustrated by FIGS. 8-11, the first discharge capacities of the sodium-containing oxide cathode materials provided in Example 2, Example 10, and Example 12 are 137.2 mAh/g, 158.7 mAh/g, and 163.7 mAh/g, respectively, which are significantly higher than the first discharge capacity (116.1 mAh/g) of the sodium-containing oxide cathode material prepared in the Comparative Example 2, indicating that the sodium-containing oxide cathode materials provided by the present disclosure have a higher specific discharge capacity.

FIG. 12, FIG. 13, FIG. 14, FIG. 15 and FIG. 16 are graphs showing the cycle stability of the sodium ion batteries assembled with the positive electrodes made from the sodium-containing oxide cathode materials prepared in Example 1, Example 9, Example 12, Example 16, and Comparative Example 2, respectively; as illustrated by FIGS. 12-16, the capacity retention rates of the sodium-containing oxide cathode materials provided in Example 1, Example 9, Example 12, and Example 16 after 80 charge-discharge cycles at the current 1C are 88.6%, 94.5%, 95.7%, and 96% respectively, each is significantly higher than the capacity retention rate (51.8%) of the sodium-containing oxide cathode material prepared in Comparative Example 2 under the same test conditions, indicating that the sodium-containing oxide cathode materials provided by the present disclosure have a desirable cycle life.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A sodium-containing oxide cathode material, wherein a content of a soluble alkali on a surface of the cathode material satisfys the following conditions:

$m(Na_2CO_3)+m(NaOH)$ is less than or equal to 15000 ppm; (1)

$0.1 \leq m(Na_2CO_3)/m(NaOH) \leq 1$; (2)

wherein $m(Na_2CO_3)$ denotes a content of $Na_2CO_3$ on the surface of the cathode material; $m(NaOH)$ denotes a content of NaOH on the surface of the cathode material.

2. The sodium-containing oxide cathode material of claim 1, wherein the content of the soluble alkali on the surface of the cathode material satisfys the following conditions:

$m(Na_2CO_3)$ in (NaOH) is less than or equal to 12000 ppm; (1)

$0.1 \leq m(Na_2CO_3)/m(NaOH) \leq 0.6$. (2)

3. The sodium-containing oxide cathode material of claim 1, wherein the cathode material is heat treated under the temperature condition of 500-900° C., and the content of the soluble alkali on the surface of the cathode material after treatment satisfys the following conditions:

$\Delta\lambda[m(Na_2CO_3)+m(NaOH)]$ is less than or equal to 10%;

$\Delta\lambda[m(Na_2CO_3)/m(NaOH)]$ is less than or equal to 50%;

wherein, $$\Delta\lambda[m(Na_2CO_3)+m(NaOH)] = \frac{[m(Na_2CO_3)+m(NaOH)]_0 - [m(Na_2CO_3)+m(NaOH)]_1}{[m(Na_2CO_3)+m(NaOH)]_0} \times 100\%;$$

$$\Delta\lambda[m(Na_2CO_3)/m(NaOH)] = \frac{m(Na_2CO_3)_1/m(NaOH)_1 - m(Na_2CO_3)_0/m(NaOH)_0}{m(Na_2CO_3)_0/m(NaOH)_0} \times 100\%;$$

$[m(Na_2CO_3)+m(NaOH)]_0$ denotes a total content of the soluble alkali on the surface of the cathode material before treatment; $[m(Na_2CO_3)+m(NaOH)]_1$ denotes a total content of soluble alkali on the surface of the cathode material after treatment; $m(NaOH)_0$ denotes the content of NaOH on the surface of the cathode material before treatment; $m(NaOH)_1$ denotes the content of NaOH on the surface of the cathode material after treatment; $m(Na_2CO_3)_0$ denotes a content of $Na_2CO_3$ on the surface of the cathode material before treatment; $m(Na_2CO_3)_1$ denotes a content of $Na_2CO_3$ on the surface of the cathode material after treatment.

4. The sodium-containing oxide cathode material of claim 3, wherein $\Delta\lambda[m(Na_2CO_3)+m(NaOH)]$ is less than or equal to 5%;
$\Delta\lambda[m(Na_2CO_3)/m(NaOH)]$ is less than or equal to 30%.

5. The sodium-containing oxide cathode material of claim 1, wherein $FWHM_{(003)}$ of a (003) crystal plane and $FWHM_{(104)}$ of a (104) crystal plane of the cathode material obtained through the X-Ray Diffraction (XRD) satisfy the following conditions:

$0.1 \leq FWHM_{(003)} \leq 0.3$;

$0.1 \leq FWHM_{(104)} \leq 0.4$;

$0.5 \leq FWHM_{(003)}/FWHM_{(104)} \leq 1.2$;

and/or, a peak area $S_{(003)}$ of the (003) crystal plane and peak area $S_{(104)}$ of the (104) crystal plane of the cathode material obtained through XRD meet the following conditions:

$0.5 \leq S_{(003)}/S_{(104)} \leq 1.5$;

and/or, a tap density of the cathode material is more than or equal to 1.2 $g/cm^3$;
and/or, a compacted density of the cathode material is more than or equal to 2.5 $g/cm^3$;
and/or, a specific surface area BET of the cathode material meets the following conditions:

0.5 $m^2/g \leq BET \leq 4$ $m^2/g$.

6. The sodium-containing oxide cathode material of claim 1, wherein $FWHM_{(003)}$ of a (003) crystal plane and $FWHM_{(104)}$ of a (104) crystal plane of the cathode material obtained through the X-Ray Diffraction (XRD) satisfy the following conditions:

$0.13 \leq FWHM_{(003)} \leq 0.24$;
$0.15 \leq FWHM_{(104)} \leq 0.30$;

0.7≤FWHM$_{(003)}$/FWHM$_{(104)}$≤1;
and/or, a peak area S$_{(003)}$ of the (003) crystal plane and a peak area S$_{(104)}$ of the (104) crystal plane of the cathode material obtained through XRD meet the following conditions:

0.7≤S$_{(003)}$/S$_{(104)}$≤1.2;

and/or, a tap density of the cathode material is more than or equal to 1.5 g/cm$^3$;
and/or, the compacted density of the cathode material is more than or equal to 2.8 g/cm$^3$;
and/or, the specific surface area BET of the cathode material meets the following conditions:

1.5 m$^2$/g≤BET≤3 m$^2$/g.

7. The sodium-containing oxide cathode material of claim 1, wherein the cathode material has a composition represented by the general formula I:

Na$_{1-x}$[Mn$_y$Fe$_z$M$_u$]M'$_j$O$_{2-w}$F$_w$     formula I wherein 0≤x≤0.4, 0.2≤y≤0.6, 0.1≤z≤0.4, 0≤u≤0.5, 0≤j≤0.1, 0≤w≤0.1, M is an element selected from the group consisting of Li, Mg, Al, Cu, Zn, Zr, Nb, Co, Ti, Y, Sc, Cr, W, La, Mo, Os, Pr, Re, Ru, Sr, Sin, Ta, and a combination thereof; and M' is an element selected from the group consisting of Mg, Al, Cu, Zn, Zr, Nb, Co, Ti, Y, Sc, Cr, W, La, Mo, Os, Pr, Re, Ru, Sr, Sin, Ta, and a combination thereof.

8. The sodium-containing oxide cathode material of claim 7, wherein 0.05≤x≤0.3, 0.3≤y≤0.5, 0.15≤z≤0.35, 0≤u≤0.3, 0≤j≤0.05, 0≤w≤0.05, M is an element selected from the group consisting of Li, Mg, Al, Cu, Zn, Zr, Nb, Co, Ti, Y, Sc, Cr, W, La, Mo, Sr, and a combination thereof; and M' is an element selected from the group consisting of Mg, Al, Cu, Zn, Zr, Nb, Co, Ti, Y, Sc, Cr, W, La, Mo, Sr, and a combination thereof.

9. A method for preparing the sodium-containing oxide cathode material comprising the following steps:
subjecting a sodium-manganese-iron-containing cathode material precursor to first sintering, cooling, crushing, and sieving to obtain a sodium-containing oxide cathode material;
wherein an oxygen-containing atmosphere is introduced during the first sintering process;
a flow rate of the introduced oxygen-containing atmosphere is within a range of 1-15 m$^3$/h, and a humidity of the oxygen-containing atmosphere is less than or equal to 10 RH %;
a temperature T1 of the first sintering satisfys the following conditions: 500×(1+y)≤T1≤400×(3−y)° C., y denotes a content of Mn in the sodium-containing oxide cathode material;
a constant temperature time of the first sintering is within a range of 6-20 h;
a temperature rise rate of the first sintering is less than or equal to 10° C./min.

10. The method of claim 9, wherein the flow rate of the introduced oxygen-containing atmosphere is within a range of 2-8 m$^3$/h, and the humidity of the oxygen-containing atmosphere is less than or equal to 6 RH %;
and/or, the oxygen-containing atmosphere comprises air and/or oxygen gas;
and/or, the temperature T1 of the first sintering meets the following conditions: 550×(1+y)≤T1≤380×(3−y)° C.;
and/or, the constant temperature time of the first sintering is within the range of 8-15 h;

and/or, the temperature rise rate of the first sintering is less than or equal to 8° C./min.

11. The method of claim 9, wherein the sodium-manganese-iron-containing oxide cathode material precursor is selected from a mixture of [Mn$_y$Fe$_z$M$_u$](OH)$_2$, a Na source, and an additive M;
or a mixture of [Mn$_y$Fe$_z$M$_u$]CO$_3$, a Na source, and an additive M;
or a mixture of Mn oxide and/or Mn hydroxide, Fe oxide and/or Fe hydroxide in a molar ratio of n(Mn):n(Fe)=y:z with a Na source and an additive M;
wherein a dosage of the Na source in the sodium-manganese-iron-containing oxide cathode material precursor meets the following conditions: 0.6≤n(Na)/n(Mn+Fe+M)≤1;
the dosage of the additive M in the sodium-manganese-iron-containing oxide cathode material precursor meets the following conditions: 0<n(M)/n(Mn+Fe+M)≤0.5; 0.2≤y≤0.6, 0.1≤z≤0.4, 0≤u≤0.5, M is at least one element selected from the group consisting of Mg, Al, Cu, Zn, Zr, Nb, Co, Ti, Y, Sc, Cr, W, La, Mo, Os, Pr, Re, Ru, Sr, Sin, and Ta.

12. The method of claim 9, wherein a method for preparing the sodium-manganese-iron-containing cathode material precursor comprising the following step:
uniformly mixing Mn oxide and/or Mn hydroxide, Fe oxide and/or Fe hydroxide in a molar ratio of n(Mn):n(Fe)=y:z with a Na source and an additive M to obtain the sodium-manganese-iron-containing oxide cathode material precursor;
or a method for preparing the sodium-manganese-iron-containing cathode material precursor comprising the following steps:
(1) preparing a mixed salt solution with an Mn salt and a Fe salt according to a molar ratio of n(Mn):n(Fe)=y:z; preparing a precipitating agent solution, a complexing agent solution, and an additive M solution with a precipitating agent, a complexing agent, and optionally an additive M respectively; introducing the mixed salt solution, the precipitating agent solution and the complexing agent solution into a reaction kettle in a concurrent flow, and carrying out a coprecipitation reaction to obtain a solid-liquid mixture, then filtering the solid-liquid mixture to obtain a filter cake, drying and sieving the filter cake to obtain an intermediate product;
(2) blending the intermediate product, a sodium source, and an optional additive M to obtain the sodium-manganese-iron-containing cathode material precursor;
wherein the additive M is added at least in step (1) or step (2).

13. The method of claim 12, wherein the sodium source is at least one selected from the group consisting of sodium hydroxide, sodium carbonate, sodium sulfate, sodium oxalate, sodium chloride, sodium citrate, and sodium fluoride;
and/or, the additive M is at least one selected from the group consisting of oxides, hydroxides, oxyhydroxides, phosphates, fluorides, borides, carbonates, and oxalates containing element M;
and/or, the additive M is used in an amount such that in the sodium-manganese-iron-containing cathode material precursor, 0<n(M)/n(Mn+Fe+M)≤0.5;
and/or, the sodium source is used in an amount such that in the sodium-manganese-iron-containing cathode material precursor, 0.6≤n(Na)/n(Mn+Fe+M)≤1.

14. The method of claim 9, wherein the method further comprising: mixing and washing the sodium-containing oxide cathode material with a washing liquid, then filtering the mixture to obtain a filter cake, and drying the filter cake.

15. The method of claim 14, wherein the washing liquid is selected from water and/or an acidic solution;

and/or, the weight ratio of the sodium-containing oxide cathode material to the washing liquid is (0.5-3):1;

and/or, the concentration of the acidic solution is 0.1-5 mol/L;

and/or, the washing conditions comprising: washing for 3-60 min under the stirring rate of 100-1,000 rpm and a temperature of 0-25° C.

16. The method of claim 9, wherein the method further comprising: subjecting the sodium-containing oxide cathode material and a coating agent M' to the ball milling and mixing, carrying out second sintering, cooling, crushing, and sieving the sintered product to obtain the sodium-containing oxide cathode material;

wherein an oxygen-containing atmosphere is introduced during the second sintering process;

the flow rate of the introduced oxygen-containing atmosphere is within the range of 1-15 m³/h, and the humidity of the oxygen-containing atmosphere is less than or equal to 10 RH %;

the temperature T2 of the second sintering meets the following conditions: $250\times(1+y) \leq T2 \leq 300\times(3-y)$° C., y denotes the content of Mn in the sodium-containing oxide cathode material;

the constant temperature time of the second sintering is within the range of 4-20 h;

the temperature rise rate of the second sintering is less than or equal to 10° C./min.

17. The method of claim 16, wherein the coating agent M' is used in an amount such that in the sodium-containing oxide cathode material, $0 \leq n(M')/n(Mn+Fe+M\pm M') \leq 0.1$.

18. A positive electrode comprising at least 80 wt % of a sodium-containing oxide cathode material, based on a total weight of the positive electrode; wherein the sodium-containing oxide cathode material is the sodium-containing oxide cathode material of claim 1.

19. The positive electrode of claim 18, wherein a pole piece density of the positive electrode is more than or equal to 2.8 g/cm³.

20. A sodium ion battery comprising the sodium-containing oxide cathode material of claim 1 or a positive electrode comprising at least 80 wt % of a sodium-containing oxide cathode material based on a total weight of the positive electrode.

* * * * *